(12) United States Patent
Pelentir et al.

(10) Patent No.: US 12,485,494 B2
(45) Date of Patent: Dec. 2, 2025

(54) SPADE DRILL BITS

(71) Applicant: BLACK & DECKER INC., New Britain, CT (US)

(72) Inventors: Paulo Sergio Dos Santos Pelentir, Caxias do Sol (BR); Ricardo Casagranda Dendena, Garibaldi (BR)

(73) Assignee: BLACK & DECKER INC., New Britain, CT (US)

( * ) Notice: Subject to any disclaimer, the term of this patent is extended or adjusted under 35 U.S.C. 154(b) by 605 days.

(21) Appl. No.: 17/697,042

(22) Filed: Mar. 17, 2022

(65) Prior Publication Data

US 2022/0305570 A1 Sep. 29, 2022

Related U.S. Application Data

(60) Provisional application No. 63/165,379, filed on Mar. 24, 2021.

(51) Int. Cl.
*B23B 51/00* (2006.01)
*B27G 15/00* (2006.01)

(52) U.S. Cl.
CPC .......... *B23B 51/0095* (2022.01); *B27G 15/00* (2013.01); *B23B 2260/104* (2013.01)

(58) Field of Classification Search
CPC .......... B23B 51/00035; B23B 2251/18; B23B 2260/082; B23B 2251/68; B23B 2260/104; B23B 51/00; B23B 51/0095; B27G 15/00
USPC ........................................................ 408/225
See application file for complete search history.

(56) References Cited

U.S. PATENT DOCUMENTS

| | | | |
|---|---|---|---|
| 2,627,292 A | | 2/1953 | Konstantin |
| 3,460,409 A | * | 8/1969 | Stokey .............. B23B 51/00035 |
| | | | 407/115 |
| 3,555,935 A | | 1/1971 | Dorrenberg |
| 4,383,784 A | | 5/1983 | Gulbrandsen |
| 5,193,951 A | | 3/1993 | Schimke |
| 6,354,773 B1 | * | 3/2002 | Konen ................... B27G 15/00 |
| | | | 408/214 |

(Continued)

FOREIGN PATENT DOCUMENTS

| | | | |
|---|---|---|---|
| CA | 2522830 A1 | 7/1996 | |
| CA | 2707221 A1 * | 11/2011 | ............. B23D 51/16 |

(Continued)

OTHER PUBLICATIONS

US 7,794,185 B2, 09/2010, Durfee (withdrawn)
Extended European Search Report, EP22163668.1, Sep. 5, 2022, 11 pages, EPO.

*Primary Examiner* — Eric A. Gates
(74) *Attorney, Agent, or Firm* — Kofi A. Schulterbrandt

(57) ABSTRACT

A spade drill bit includes a shank extending along an axis from a rear end to a front end, the rear end configured to be coupled to a tool holder of a power tool, a blade including a paddle extending along the axis with a front portion and rear portion coupled to the front end of the shank, and a tip coupled to the front portion of the paddle. First and second primary cutting edges are disposed on a front edge of the front portion of the paddle and extend radially outward from the tip. At least the rear portion of the paddle is composed of a first steel alloy. The primary cutting edges are composed of a second steel alloy that has a greater hardness than the first steel alloy.

20 Claims, 21 Drawing Sheets

(56) References Cited

U.S. PATENT DOCUMENTS

| | | | |
|---|---|---|---|
| 7,267,513 B2 | 9/2007 | Wiker et al. | |
| 7,473,056 B2 | 1/2009 | Durfee | |
| D604,751 S | 11/2009 | Dost et al. | |
| D627,805 S | 11/2010 | Dost et al. | |
| 7,887,269 B2 | 2/2011 | Dost et al. | |
| 7,900,719 B2 | 3/2011 | Yao | |
| 7,905,690 B2 | 3/2011 | Durfee | |
| 7,922,429 B2 | 4/2011 | Durfee | |
| 8,147,174 B2 | 4/2012 | Durfee | |
| 8,262,325 B2 | 9/2012 | Dost et al. | |
| 8,348,559 B1 * | 1/2013 | Criswell | B27G 15/00 408/239 R |
| 8,366,357 B2 | 2/2013 | Dost et al. | |
| 8,646,547 B1 * | 2/2014 | Johnson | A01K 97/01 175/18 |
| 8,979,444 B2 | 3/2015 | Dost | |
| 9,156,094 B2 | 10/2015 | Durfee et al. | |
| 9,333,564 B2 | 5/2016 | Santamarina et al. | |
| 9,687,998 B2 | 6/2017 | Li | |
| 9,724,764 B2 | 8/2017 | Dost et al. | |
| 9,724,765 B2 | 8/2017 | Ach et al. | |
| 10,029,315 B2 | 7/2018 | Lau et al. | |
| D863,384 S * | 10/2019 | Weber | D15/139 |
| D890,826 S | 7/2020 | Howell | |
| D917,589 S | 4/2021 | Lin et al. | |
| D928,855 S | 8/2021 | Weber et al. | |
| 2002/0127071 A1 | 9/2002 | Vasudeva | |
| 2003/0133765 A1 * | 7/2003 | Capriotti | B27G 15/00 408/224 |
| 2006/0083595 A1 * | 4/2006 | Wiker | B27G 15/00 408/225 |
| 2007/0086867 A1 * | 4/2007 | Kesterson | B23B 51/06 408/59 |
| 2008/0101879 A1 * | 5/2008 | Durfee | B27G 15/00 408/214 |
| 2008/0166194 A1 | 7/2008 | Durfee | |
| 2008/0304927 A1 * | 12/2008 | Dost | B23B 51/00035 52/741.1 |
| 2010/0003094 A1 * | 1/2010 | Durfee | B27G 15/00 408/231 |
| 2010/0202845 A1 * | 8/2010 | Fang | B23B 51/00035 408/224 |
| 2010/0247259 A1 | 9/2010 | Davidian et al. | |
| 2010/0278603 A1 * | 11/2010 | Fang | B23B 51/00 408/200 |
| 2011/0255927 A1 * | 10/2011 | Boudreau | B23D 51/16 279/144 |
| 2013/0177360 A1 * | 7/2013 | Hecht | B23C 5/202 407/113 |
| 2014/0328640 A1 | 11/2014 | Santamarina et al. | |
| 2014/0356087 A1 * | 12/2014 | Best | B23B 51/06 408/58 |
| 2015/0202792 A1 * | 7/2015 | Li | B27G 15/00 408/211 |
| 2016/0229010 A1 | 8/2016 | Wang et al. | |
| 2017/0113284 A1 * | 4/2017 | Lee | B23B 51/00 |
| 2018/0272440 A1 * | 9/2018 | Deluca | B23B 51/02 |
| 2021/0268590 A1 | 9/2021 | Ren et al. | |

FOREIGN PATENT DOCUMENTS

| | | | | |
|---|---|---|---|---|
| CN | 205147410 U | | 4/2016 | |
| CN | 105983848 A | | 10/2016 | |
| CN | 106994585 A | | 8/2017 | |
| CN | 210025632 U | * | 2/2020 | ......... B23B 51/0054 |
| DE | 202015101369 U1 | | 3/2015 | |
| DE | 102016105945 A1 | | 10/2017 | |
| EP | 1524052 A2 | | 4/2005 | |
| EP | 2835201 A1 | | 2/2015 | |
| EP | 2842673 A1 | | 3/2015 | |
| EP | 3045261 A1 | | 7/2016 | |
| GB | 1360221 A | | 7/1974 | |
| GB | 2431368 A | * | 4/2007 | ......... B23B 51/0009 |
| GB | 2443543 A | * | 5/2008 | ......... B23B 51/0009 |
| GB | 2458598 A | * | 9/2009 | ......... B23B 51/0009 |
| HU | T76966 A | * | 1/1998 | |
| WO | WO-0100376 A1 | * | 1/2001 | ............. B27G 15/00 |
| WO | WO-2009049069 A1 | * | 4/2009 | ......... B23B 51/0009 |
| WO | 2011102570 A1 | | 8/2011 | |
| WO | WO-2013166182 A1 | * | 11/2013 | ............. B23B 51/00 |
| WO | WO-2020082976 A1 | * | 4/2020 | ........... B23B 1/0054 |
| WO | WO-2022266417 A1 | * | 6/2022 | ............. B27G 15/00 |

* cited by examiner

SPADE DRILL BITS

RELATED APPLICATION

This application claims priority under 35 U.S.C. § 119(e) to U.S. Provisional Application No. 63/165,379, filed Mar. 24, 2021, which is incorporated by reference.

TECHNICAL FIELD

This application relates to spade drill bits.

BACKGROUND

Spade drill bits are used for boring holes between approximately ¼" and ½" diameter in wood and similar soft materials. Their name derives from the shape of the spade-like or paddle-shaped blade, in contrast to the spiral shape of augers and twist drills. The blade, which is usually forged integrally from the shank, is relatively thin and flat and may have a width several times the diameter of the shank. Examples of spade drill bits are disclosed in U.S. Pat. Nos. 4,682,917 and 8,147,174, which are incorporated by reference.

SUMMARY

In an aspect, a spade drill bit includes a shank extending along an axis from a rear end to a front end, the rear end configured to be coupled to a tool holder of a power tool. A blade including a paddle extends along the axis with a front portion and rear portion coupled to the front end of the shank. A tip is coupled to the front portion of the paddle and extends along the axis. First and second primary cutting edges are disposed on a front edge of the front portion of the paddle and extend radially outward from the tip. The paddle includes a first face with a first concave surface and a first convex surface on opposite sides of the axis, and a second face opposite the first face with a second concave surface and a second convex surface on opposite sides of the axis, the first concave surface opposite the first convex surface and the second concave surface opposite the second convex surface. The rear portion of the paddle is composed of a first steel alloy and the front portion of the paddle is composed of a second steel alloy that has a greater hardness than the first steel alloy.

Implementations of this aspect may include one or more of the following features. Each of the recessed surfaces may be concavely curved with a first portion closer to the primary cutting edges with a first radius of curvature and a second portion closer to the rear portion with a second radius of curvature that is different from the first radius of curvature. Each concave surface and each convex surface may extend along substantially an entirety of an axial length of the paddle. The tip may be generally flat and triangular with a first tip cutting edge extending forward from the first primary cutting edge and toward the axis, and a second tip cutting edge extending forward from the second primary cutting edge and toward the axis. Alternatively, the tip may be frustoconical and at least partially threaded. The front portion of the paddle further may include first and second secondary cutting edges tapering radially outward from the primary cutting edges and axially rearward toward the rear portion. Side cutting edges may extend axially rearward at least partially along side edges of the paddle. The front portion may be composed of the first steel alloy and the primary cutting edges may be affixed to the front edge of the paddle. Alternatively, the front portion may composed of the second steel alloy, may be affixed to the rear portion at a joint, and may include the primary cutting edges. The first steel alloy may comprise a carbon steel alloy or a low alloy carbon steel and the second steel alloy may comprise a high chromium steel alloy or a high speed steel or tool steel alloy.

In another aspect, a spade drill bit includes a shank extending along an axis from a rear end to a front end, the rear end configured to be coupled to a tool holder of a power tool. A blade including a paddle extends along the axis with a front portion and rear portion coupled to the front end of the shank. A tip is coupled to the front portion of the paddle and extends along the axis. First and second primary cutting edges are disposed on a front edge of the front portion of the paddle and extend radially outward from the tip. First and second secondary cutting edges are disposed on chamfered corner edges of the front portion of the paddle and taper radially outward from the primary cutting edges and axially rearward toward the rear portion. At least the rear portion of the paddle is composed of a first steel alloy and the primary and secondary cutting edges are composed of a second steel alloy that has a greater hardness than the first steel alloy.

Implementations of this aspect may include one or more of the following features. The paddle may include a first flat face with a first recessed surface extending rearward from the first primary cutting edge along at least a portion of the paddle, and a second flat face opposite the first face extending rearward from the second primary cutting edge along at least a portion of the paddle, the second recessed surface on an opposite side of the axis from the first recessed surface. Each of the recessed surfaces may be concavely curved with a first portion closer to the front edge of the paddle with a first radius of curvature and a second portion closer to the rear portion of the paddle with a second radius of curvature that is different from the first radius of curvature. The paddle may include a first face with a first concave surface and a first convex surface on opposite sides of the axis, and a second face opposite the first face with a second concave surface and a second convex surface on opposite sides of the axis, the first concave surface opposite the first convex surface and the second concave surface opposite the second convex surface. Each concave surface and each convex surface may extend along an entirety of an axial length of the paddle. The tip may be generally flat and triangular with a first tip cutting edge extending forward from the first primary cutting edge and toward the axis, and a second tip cutting edge extending forward from the second primary cutting edge and toward the axis. Alternatively, the tip may be frustoconical and at least partially threaded. Side cutting edges may extend axially rearward from the first and second secondary cutting edges at least partially along side edges of the paddle. The front portion may be composed of the first steel alloy and the primary cutting edges and the secondary cutting edges may be affixed to the front edge of the paddle. Alternatively, the front portion may be composed of the second steel alloy, may be affixed to the rear portion at a joint, and may include the primary and secondary cutting edges. The first steel alloy may comprise a carbon steel alloy or low alloy carbon steel and wherein the second steel alloy comprises a high chromium steel alloy or a high speed steel or tool steel alloy.

In another aspect, a spade drill bit includes a shank extending along an axis from a rear end to a front end, the rear end configured to be coupled to a tool holder of a power tool. A blade includes a paddle extending along the axis with a rear portion coupled to the front end of the shank and a front portion coupled to a front end of the rear portion at a joint. An at least partially threaded frustoconical tip is coupled to the front portion of the paddle. First and second primary cutting edges are disposed on a front edge of the front portion of the paddle and extend radially outward from the tip. First and second secondary cutting are disposed on chamfered corner edges of the front portion of the paddle and taper radially outward from the primary cutting edges and axially rearward toward the rear portion. The paddle includes a first face with a first concave surface disposed on a first side of the axis and extending rearward from the first primary cutting edge along at least a portion of the paddle, and a second face opposite the first face with a second concave surface disposed on a second side of the axis opposite the first side and extending rearward from the second primary cutting edge axis along at least a portion of the paddle. The rear portion of the paddle is composed of a first carbon steel or low alloy carbon steel, and the front portion of the paddle, which includes the primary and secondary cutting edges, is composed of a second high chromium steel alloy or a high speed steel or tool steel alloy that has a greater hardness than the first steel alloy.

In another aspect, a spade drill bit includes a shank extending along an axis from a rear end to a front end, the rear end configured to be coupled to a tool holder of a power tool. A blade extends axially along the axis, the blade having a front portion and a rear portion coupled to the shank. A tip is coupled to and extending along the axis from a center of the front portion of the blade. The blade includes a paddle portion having a first face and a second face opposite the first face, first and second primary cutting edges extending radially outward from the tip along the front portion of the blade, and first and second side edges extending rearward from the shoulders toward the rear portion of the blade. The paddle portion is composed of a first steel alloy and the first and second primary cutting edges are composed of a second steel alloy that has a greater hardness than the first steel alloy.

Implementations of this aspect may include one or more of the following features. The paddle portion may include a first recessed surface defined in the first face and extending rearward from the first primary cutting edge and a second recessed surface defined in the second face and extending rearward from the second primary cutting edge. The tip may be flattened with a first tip face and a second tip face opposite the first tip face. The first tip face may include a third recessed portion in communication with the first recessed portion and the second tip face including a fourth recessed portion in communication with the second recessed portion. The spade first recessed surface and the second recessed surface may be concavely curved. The paddle portion may include a first convexly curved surface on the second face opposite the first concavely curved surface and a second convexly curved surface on the first face opposite the second concavely curved surface. Each of the concavely curved surfaces may have a first portion closer to the front portion of the blade with a first radius of curvature and a second portion closer to the rear portion of the blade with a second radius of curvature that is greater than the first radius of curvature. Each concavely curved surface may extend along substantially an entirety of an axial length of the paddle portion. Each concavely curved surface may extend from each primary cutting edge along a portion of an axial length of the paddle portion.

The blade may include a first chamfer at a junction between the first cutting edge and the first side edge and a second chamfer at a junction between the second cutting edge and the second side edge. The first chamfer may extend at a first acute angle to the axis radially outward and axially rearward from the first primary cutting edge to the first side edge and the second chamfer may extend at a second acute angle to the axis radially outward and axially rearward from the second primary cutting edge to the second side edge. The first secondary cutting edge may extend from the first primary cutting edge and the second chamfer may define a second secondary cutting edge extending from the second primary cutting edge. Each secondary cutting edge may be composed of the second steel alloy.

The tip may be flattened and triangular in shape with a first tip face, a second tip face opposite the first tip face, and an apex at a front end of the tip. The tip may include a first tip cutting edge extending from the first primary cutting edge toward the apex and a second tip cutting edge extending from the second primary cutting edge toward the apex. The first tip cutting edge and the second tip cutting edge may be composed of the second steel alloy. The tip may be conical and at least partially threaded along its axial length. The first side edge may include a first side cutting edge and the second side edge may include a second side cutting edge. Each of the first and second side cutting edges may be composed of the first steel alloy. The second steel alloy may be welded to the first steel alloy and ground to form the first primary cutting edge and the second primary cutting edge.

The first steel alloy may comprise a carbon steel or low alloy carbon steel. The carbon steel or low alloy carbon steel may comprise one or more of the following: SAE 1065, SAE 1060, SAE4140, SAE 52100, or SAE 1045. The second steel alloy may comprise a high chromium steel alloy. The high chromium steel alloy may comprise one or more of the following: DIN 85555 SG-6-60-GTZ, WSG 3-GZ-55-ST, or DIN 8555 SG 4-60-S. The second steel alloy may comprise a high speed steel or tool steel alloy. The high speed steel or tool steel alloy may comprise one or more of the following: SAE M2, M7, M52, M50, or M7. The first steel alloy may have a hardness of approximately 46 HRC to approximately 52 HRC and the second steel alloy may have a hardness of approximately 57 HRC to approximately 62 HRC.

In another aspect, a method of manufacturing a spade drill bit includes providing a blank from bar stock composed of a first steel alloy. A shank is formed in a first portion of the blank and extends along an axis from a rear end to a front end. A blade is formed with a tip in a second portion of the blank. The blade extends along the axis from a rear portion coupled to the shank to a front portion. The tip extends along the axis from the front portion. The blade includes a paddle portion having a first face and a second face opposite the first face, first and second front edges extending radially outward from the tip along the front portion of the blade, and first and second side edges extending rearward from the first and second front edges toward the rear portion of the blade. A bead of a second steel alloy is welded along the first and second front edges of the blade. The second steel alloy is harder than the first steel alloy. First and second cutting edges are formed in the bead of the second steel alloy along the first and second front edges of the blade.

Implementations of this aspect may include one or more of the following features. Forming the shank may include cold forming the first portion of the blank to form shank. Forming the blade and the tip may include forging the second portion of the blank to form the blade and the tip. The blank may be heat treated after forming the shank, the blade, and the tip and before welding the bead of the second steel to the first and second front edges of the blade. Surface oxidation may be removed between the heat treating and the welding steps. The surface oxidation may be removed by shot blasting. Forming the first and second cutting edges may include sharpening the bead of the second steel alloy. Excess weld may be deburred between the welding step and the sharpening step. In certain implementations, no heat treatment is performed after welding the bead of the second steel alloy.

The first steel alloy may comprise a carbon steel or low alloy carbon steel. The carbon steel or low alloy carbon steel may comprise one or more of the following: SAE 1065, SAE 1060, SAE4140, SAE 52100, or SAE 1045. The second steel alloy may comprise a high chromium steel alloy. The high chromium steel alloy may comprise one or more of the following: DIN 85555 SG-6-60-GTZ, WSG 3-GZ-55-ST, or DIN 8555 SG 4-60-S. The second steel alloy may comprise a high speed steel or tool steel alloy. The high speed steel or tool steel alloy may comprise one or more of the following: SAE M2, M7, M52, M50, or M7. The first steel alloy may have a hardness of approximately 46 HRC to approximately 52 HRC and the second steel alloy may have a hardness of approximately 57 HRC to approximately 62 HRC.

The tip may be triangular with first and second tapered edges and an apex, and the welding step may include welding the bead of the second steel alloy along the first and second tapered edges. First and second tip cutting edges may be formed in the in the bead of the second steel alloy welded along the first and second tapered edges of the tip. The tip may be conical and threads may be formed along at least a portion of an axial length of the tip. First and second side cutting edges may be formed along at least portions of the first and second side edges of the blades. A first chamfered edge may be formed at a junction between the first front edge and the first side edge and a second chamfered edge may be formed at a junction between the second front edge and the second side edge. The first chamfer extends at a first acute angle to the axis radially outward and axially rearward from the first front edge to the first side edge and the second chamfer extends at a second acute angle to the axis radially outward and axially rearward from the second front edge to the second side edge. The welding step may include welding the bead of the second steel alloy along the first and second chamfered edges. First and second secondary cutting edges may be formed in the in the bead of the second steel alloy along the first and second chamfered edges.

Advantages may include one or more of the following. The spade drill bits have significantly greater life when cutting holes in nail embedded wood while maintaining cutting speed when cutting holes in wood without embedded nails. These and other advantages and features will be apparent from the description, the drawings, and the claims.

DETAILED DESCRIPTION

Figure 1:
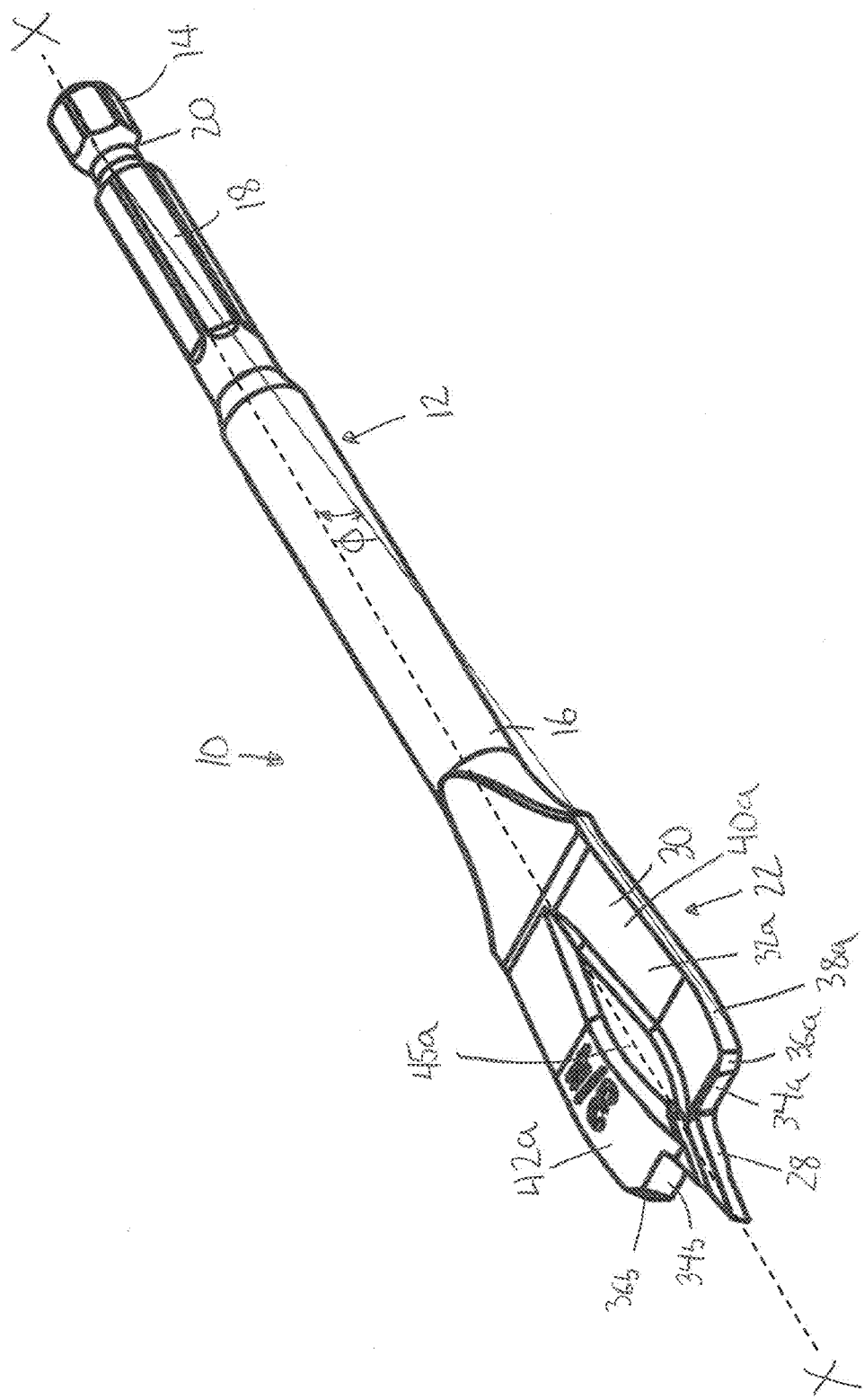
FIG. 1 is a perspective view of an implementation of a spade drill bit.
Figure 2:
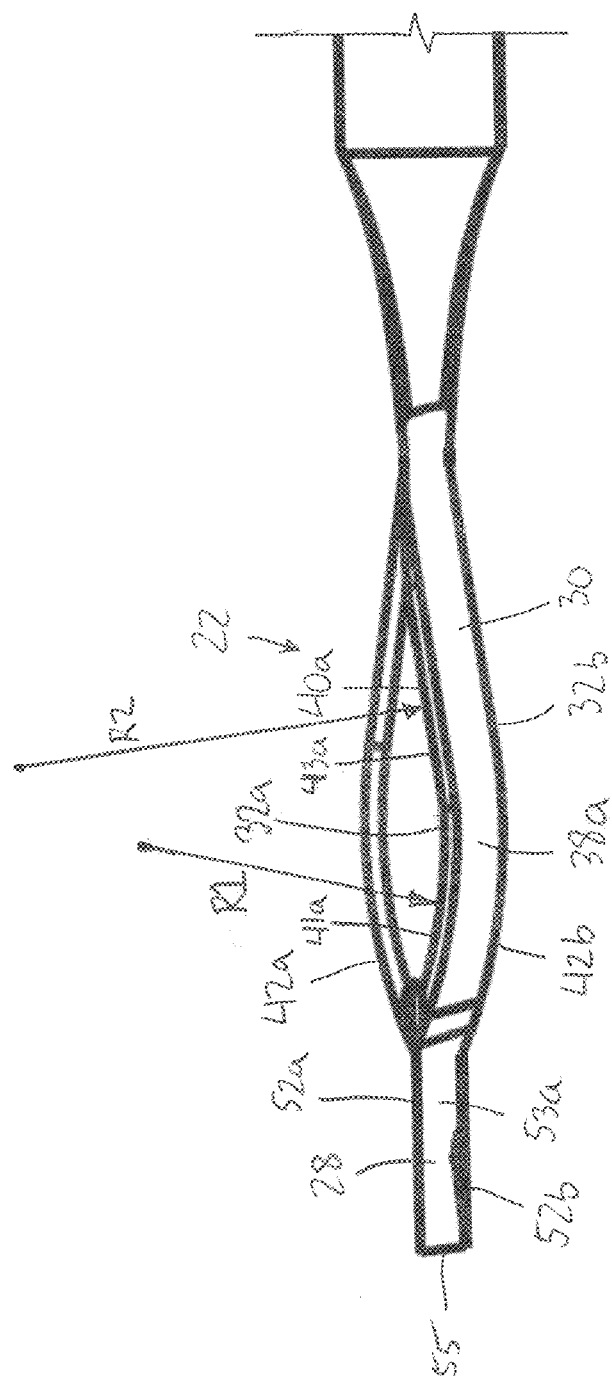
FIG. 2 is a side view of the spade drill bit of FIG. 1.

Referring to FIGS. 1-3C, an implementation of a spade drill bit 10 includes a shank 12 extending along an axis X from a rear end portion 14 to a front end portion 16. The rear end portion 14 has a hex-shaped shaft 18 with an annular groove 20 and is configured to be coupled to a tool holder of a power tool, such as a drill or impact driver (not shown). A blade 22 extends axially along the axis X and has a front portion 26 and a rear portion 24 coupled to the front portion 16 of the shank 12. The blade 22 includes a paddle portion 30 having a first face 32a and a second face 32b opposite the first face 32a. The first and second faces 32a, 32b are mirror images of one another and that have concavely and convexly curved surfaces as described in more detail below. The paddle portion 30 is bounded by first and second shoulders 34a, 34b that extend radially outward from the tip 28 generally perpendicular to the axis X, first and second optional chamfers 36a, 36b that extend radially outward and axially rearward from the shoulders 34a, 34b at an acute angle θ (e.g., approximately 40° to approximately 50° to the axis X, and first and second side faces 38a, 38b that extend axially rearward generally parallel or tapered inward relative the axis X, e.g., at an acute angle ϕ of approximately 1° to approximately 3°. In other implementations, the chamfers may not be present, and the first and second shoulders may be joined directly to the side faces.

The first and second faces 32a, 32b include first and second recessed or concavely curved surfaces 40a, 40b that define flutes 41a, 41b, respectively, on opposite sides of the axis X. The first and second faces 32a, 32b also include first and second convexly curved surfaces 42a, 42b on opposite sides of the axis X from the first and second concavely curved surfaces 40a, 40b, respectively, and on opposite faces from the second and first concavely curved surfaces 40b, 40a and respectively. First and second vertical walls 45a, 45b separate the first concave and convex surfaces 40a, 42a and the second concave and convex surfaces 40b, 42b, respectively. The concavely curved surfaces 42a, 42b extend along substantially an entirety of an axial length of the paddle portion 30. Each of the concavely curved surfaces 40a, 40b has a first portion 41a, 41b closer to the front portion 26 of the blade 22 with a first radius of curvature R1 and a second portion 43a, 43b closer to the rear portion 24 of the blade 22 with a second radius of curvature R2 that is greater than the first radius of curvature R1.

First and second primary cutting edges 46a, 46b are formed at junctions between the shoulders 34a, 34b and the concavely curved surfaces 40a, 40b, respectively. Optional first and second secondary cutting edges 48a, 48b are formed at junctions between the chamfers 36a, 36b and the concavely curved surfaces 40a, 40b, respectively. First and second side edges 50a, 50b, which may or may not have side cutting edges 51a, 51b, are formed at junctions between the side faces 38a, 38b and the concavely curved surfaces 40a, 40b, respectively. The concavely curved surfaces 40a, 40b are recessed relative to the cutting edges such that the concavely curved surfaces 40a, 40b provide a space to allow chips and debris to flow outward from a hole being cut by the spade drill bit 10. The concavely curved surfaces 40a, 40b may have a smooth profile with no sharp corners or flat surfaces.

The blade 22 also includes a tip 28 that extends from a center of the front portion 24 of the paddle portion 30 along the axis X. The tip 28 has a generally flattened triangular shape with a first tip face 52a generally co-planar with the first face 32a of the paddle portion 30, and a second tip face 52b generally co-planar with the second face 32b of the paddle portion 30. The first and second tip faces 52a, 52b are bounded by first and second tip side faces 53a, 53b that meet at an apex 55. In the illustrated implementation, the apex 55 comprises a blunt or unsharpened edge. The first and second tip faces 52a, 52b include first and second recessed portions 54a, 54b, respectively, on opposite sides of the axis X that may be in communication with the first and second recessed or concavely curved portions 40a, 40b, respectively, on the paddle portion X. The first and second tip faces 52a, 52b also include first and second tip cutting edges 56a, 56b, respectively, that may be continuous with the first and second primary cutting edges 46a, 46b on the paddle portion 30, respectively.

The shank 12 and the blade 22 are composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). One or more of the primary cutting edges 46a, 46b, the secondary cutting edges 48a, 48b, the tip cutting edges 56a, 56b, and/or the side cutting edges 51a, 51b of the side edges 50a, 50b is/are composed of a second, relatively hard steel alloy, such as a high chromium steel (e.g., DIN 85555 SG-6-60-GTZ, WSG 3-GZ-55-ST, DIN 8555 SG-4-60-5, etc.) or a high speed steel or tool steel (e.g., SAE M2, M7, M52, M7, M50, S7, Calmax, etc.). The first steel alloy may have a lower hardness, such as approximately 46-54 HRC (e.g., approximately 50 HRC), while the second steel alloy may have a higher hardness, such as approximately 57-62 HRC (e.g., approximately 60 HRC). The second steel alloy that forms the cutting edge(s) may be attached to the first steel alloy of the blade, e.g., by welding a bead or strip of the second steel alloy to the first steel alloy along the cutting edges, as further described in a first implementation of a manufacturing process described below. As described further below, the harder steel alloy on the cutting edges facilitates significant and unexpected improvements in life of the spade drill bit when cutting holes in wood embedded with nails, while not materially reducing the cutting speed when forming holes in wood without embedded nails.

Figure 3A:
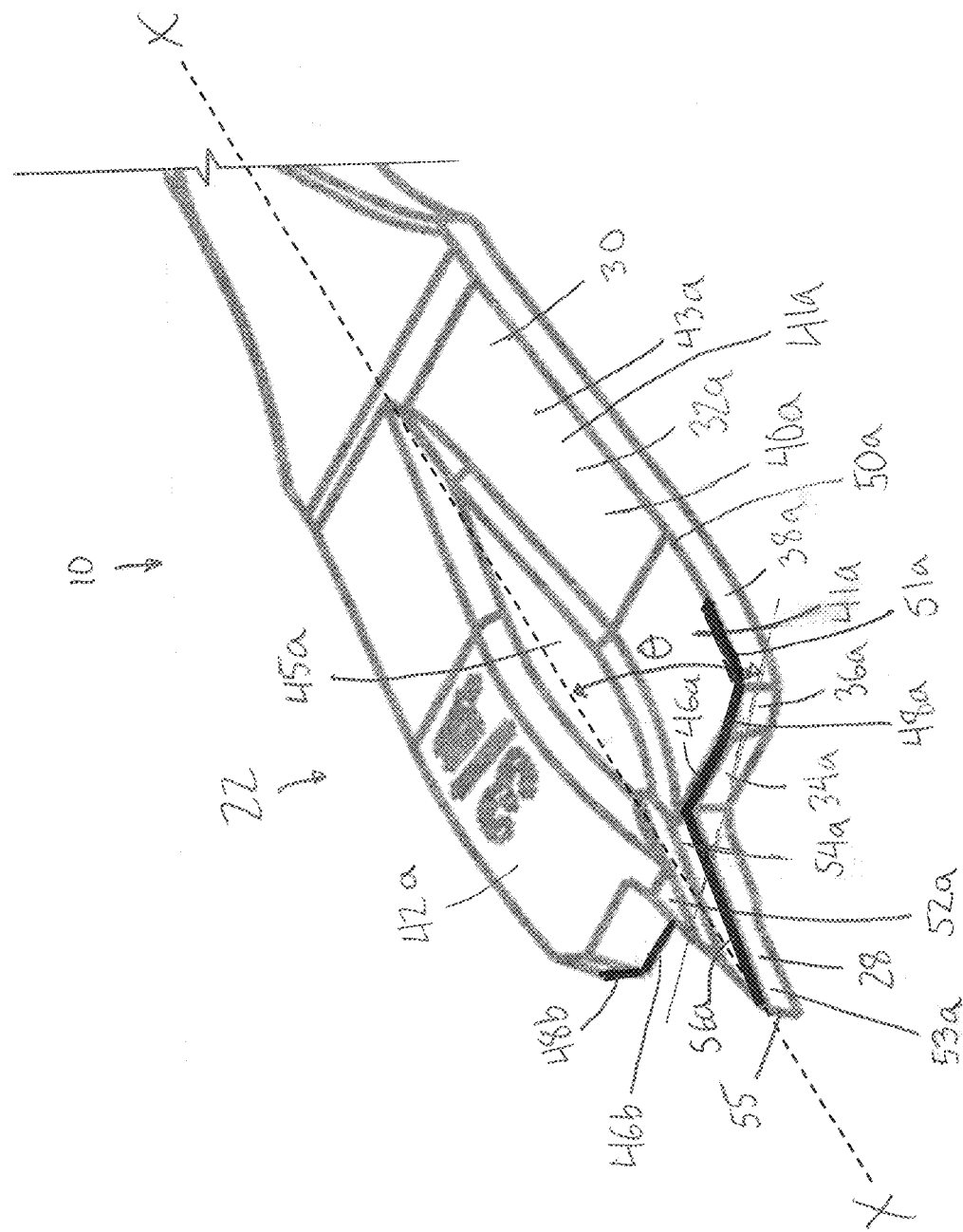
FIG. 3A is a close-up perspective view of a portion of the spade drill bit of FIG. 1 showing the first face of the blade.
Figure 3B:
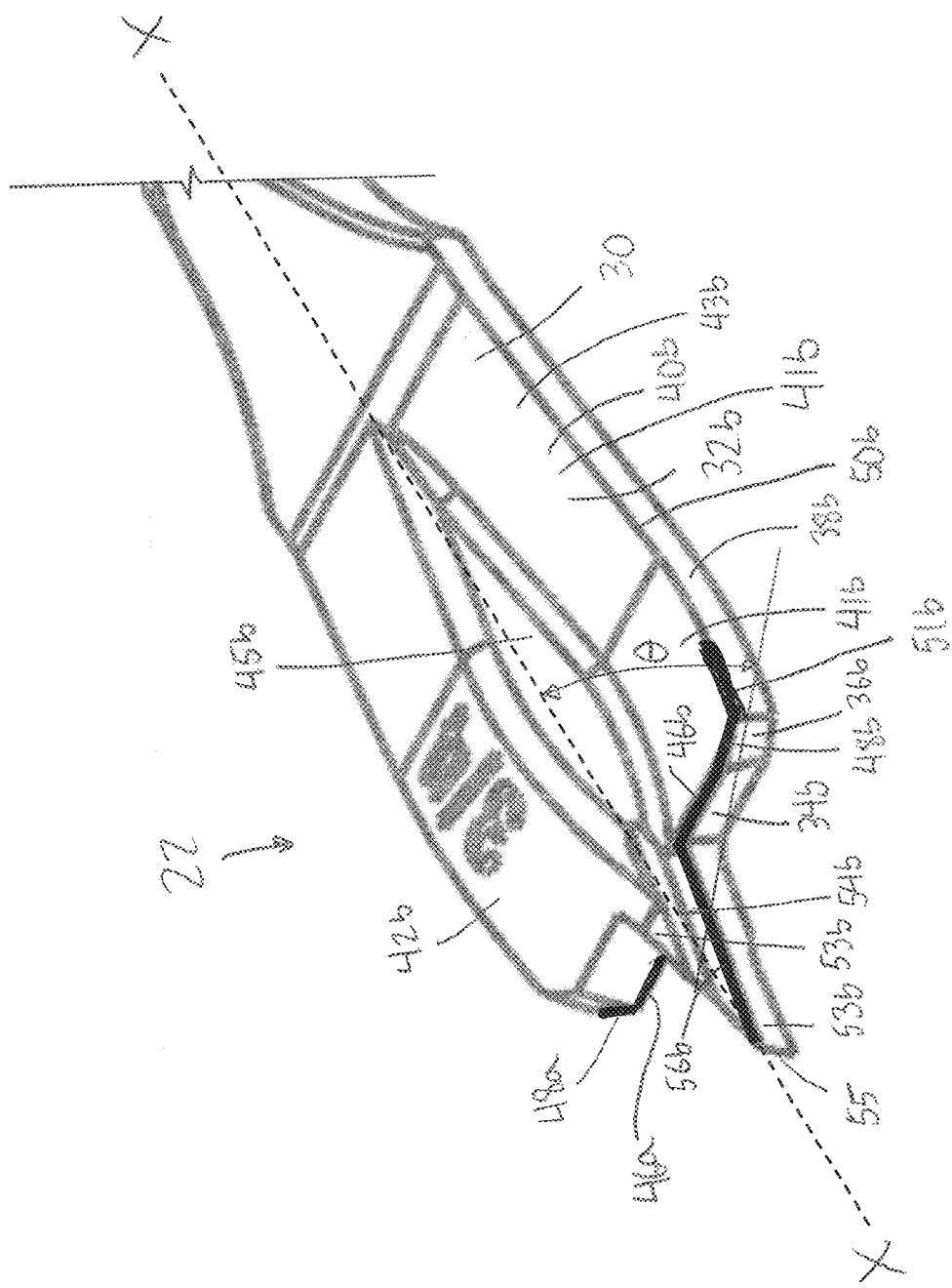
FIG. 3B is a close-up perspective view of a portion of the spade drill bit of FIG. 1 showing the second face of the blade.
Figure 3C:
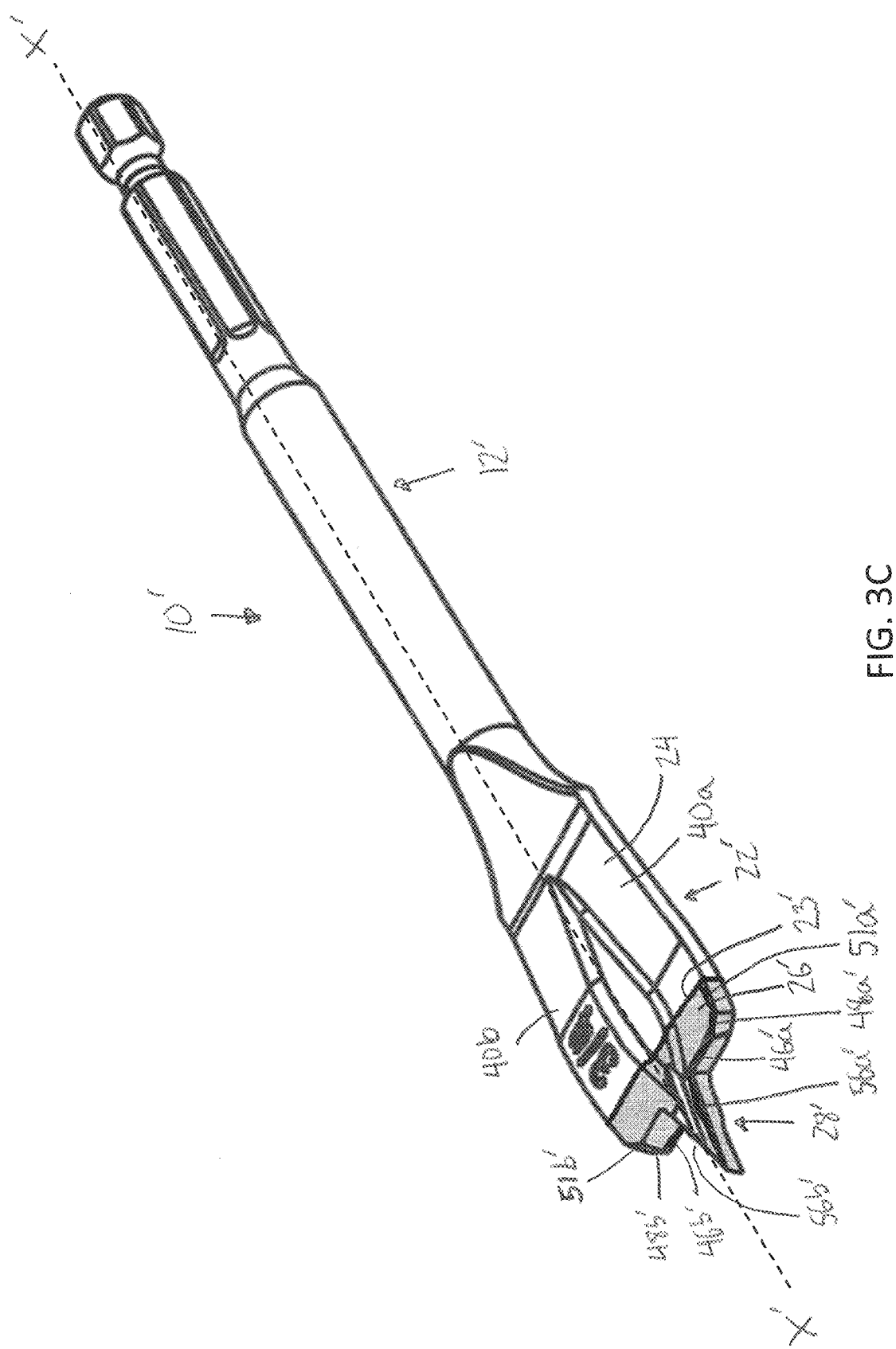
FIG. 3C is a perspective view of another implementation of a spade drill bit.

Referring also to FIG. 3C, in an alternative implementation of the spade drill bit 10 of FIGS. 1-3B, a spade drill bit 10' includes a shank 12', a blade 22', and a tip 28' extending along an axis X', similar to the shank 12, the blade 22, and the tip 28 of FIGS. 1-3B. The blade 22' includes a rear portion 24' coupled to the shank 12' and a front portion 26' that includes the tip 28' and that is coupled to the rear portion 24' at a joint 23'. The blade 22' includes first and second recessed or concavely curved surfaces (only first 40a' shown) and first and second convexly curved surfaces (only second 42b' shown) on opposite faces from the first and second concavely curved surfaces. The front portion 24' of the blade 22' also includes tip cutting edges 56a', 56b', first and second primary cutting edges 46a', 46b', optional first and second secondary cutting edges 48a', 48b', and optional first and second side cutting edges 51a', 51b'. Unlike the spade drill bit 10 of FIGS. 1-3B, in the spade drill bit 10' of FIG. 3C, the shank 12' and the rear portion 24' of the blade 22' may be composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.), while the front portion 26' of the blade 22', including the primary cutting edges 46a', 46b', the secondary cutting edges 48a', 48b', the tip cutting edges 56a', 56b', and/or the side cutting edges 51a', 51b' of the side edges 50a', 50b', is/are composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The rear portion 22a' may be formed integrally with the shank 12'. The front portion 26' of the blade 22' may be joined to the rear portion 24' of the blade 22' at the joint 23', e.g., by welding or brazing. Thus, an entirety of the front portion 22b' of blade 22, which includes all of the cutting edges, is formed of the second, relatively hard steel alloy. The spade drill bit 10' of FIG. 3C may be manufactured in accordance with a second implementation of a manufacturing process described below.

The blade 22 also includes a tip 28 that extends from a center of the front portion 24 of the paddle portion 30 along the axis X. The tip 28 has a generally flattened triangular shape with a first tip face 52a generally co-planar with the first face 32a of the paddle portion 30, and a second tip face 52*b* generally co-planar with the second face 32*b* of the paddle portion 30. The first and second tip faces 52*a*, 52*b* are bounded by first and second tip side faces 53*a*, 53*b* that meet at an apex 55. In the illustrated implementation, the apex 55 comprises a blunt or unsharpened edge. The first and second tip faces 52*a*, 52*b* include first and second recessed portions 54*a*, 54*b*, respectively, on opposite sides of the axis X that may be in communication with the first and second recessed or concavely curved portions 40*a*, 40*b*, respectively, on the paddle portion X. The first and second tip faces 52*a*, 52*b* also include first and second tip cutting edges 56*a*, 56*b*, respectively, that may be continuous with the first and second primary cutting edges 46*a*, 46*b* on the paddle portion 30, respectively.

Figure 4A:
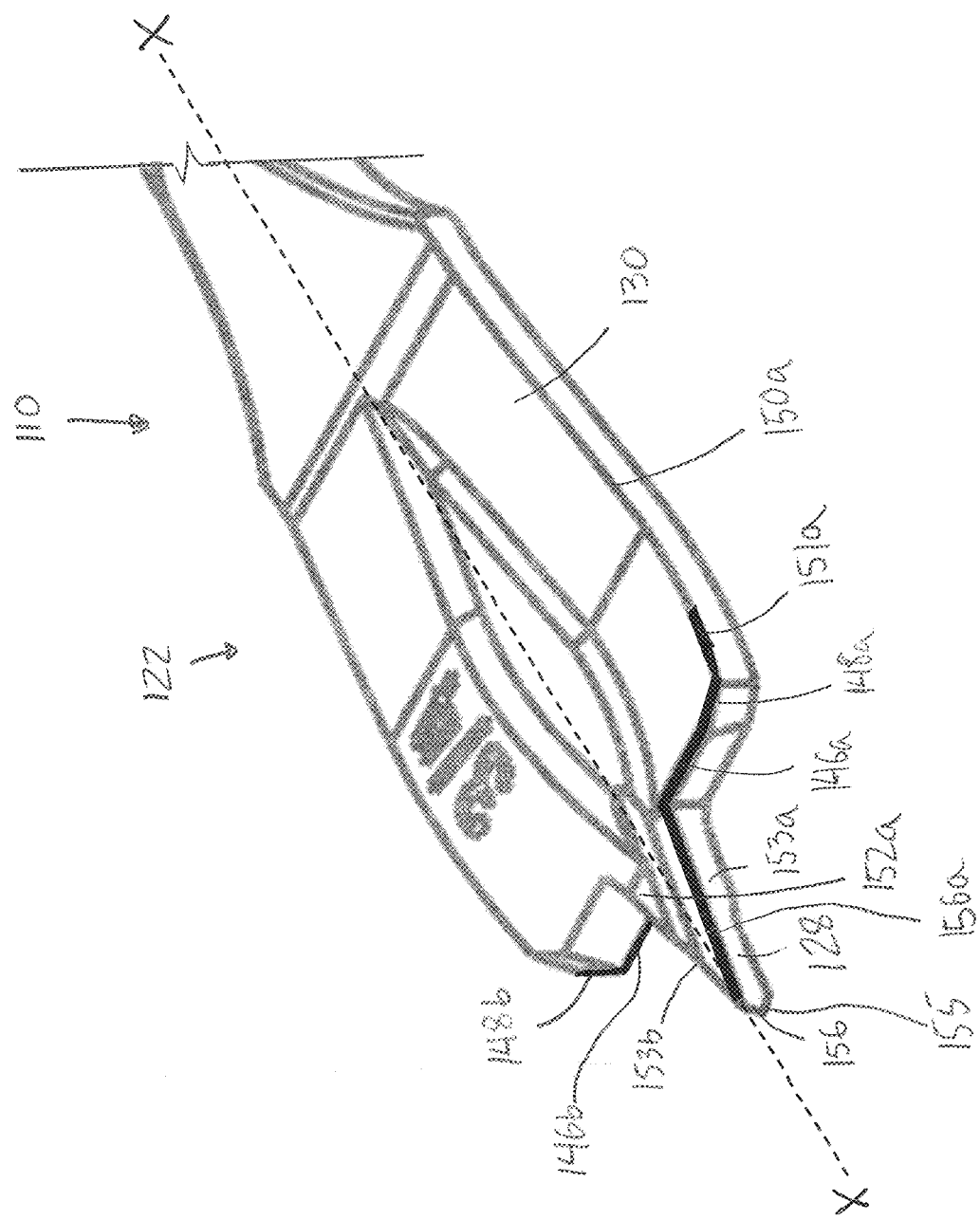
FIG. 4A is a close-up perspective view of the blade of another implementation of a spade drill bit.

Referring also to FIG. 4A, in another implementation, a spade drill bit 110 is substantially the same as the spade drill bit 10 shown in FIGS. 1-3B with the following differences. The spade drill bit 110 includes a shank and a blade 122 extending axially along an axis X from the front end of the shank, which are substantially the same as the shank 10 and blade 22 except as follows. The blade 122 includes a paddle portion 130 (which is substantially the same as paddle portion 30 with concavely and convexly curved faces) and a tip 128 that extends from a center of the front portion 24 of the paddle portion 30 along the axis X. The tip 128 has a generally flattened triangular shape with a first tip face 152*a*, a second tip face (not shown), a first tip side face 153*a*, and a second tip side face (not shown) (which are substantially the same as the first tip face 52*a*, second tip face 52*b*, first tip side face 53*a*, and second tip side face 53*b*) that meet at an apex 155. The apex 155 differs from the apex 55 in that it is sharpened to a sharp point 156. The sharp point 156 of the spade drill bit 110 may facilitate faster cutting than the blunt tip 55 of the spade drill bit 10.

Like the spade drill bit 10 of FIGS. 1-3B, the shank and the blade 122 of spade drill bit 110 are composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). The blade 122 also includes one or more of primary cutting edges 146*a*, 146*b*, secondary cutting edges 148*a*, 148*b*, tip cutting edges 156*a*, 156*b*, and/or side cutting edges 151*a*, 151*b* of side edges 150*a*, 150*b*, which each of the cutting edges composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The second steel alloy that forms the cutting edge(s) may be attached to the first steel alloy of the blade, e.g., by welding a bead or strip of the second steel alloy to the first steel alloy along the cutting edges, as further described in a first implementation of a manufacturing process described below. Other features of the spade drill bit 110 are substantially the same as the spade drill bit 10 of FIGS. 1-3B.

Figure 4B:
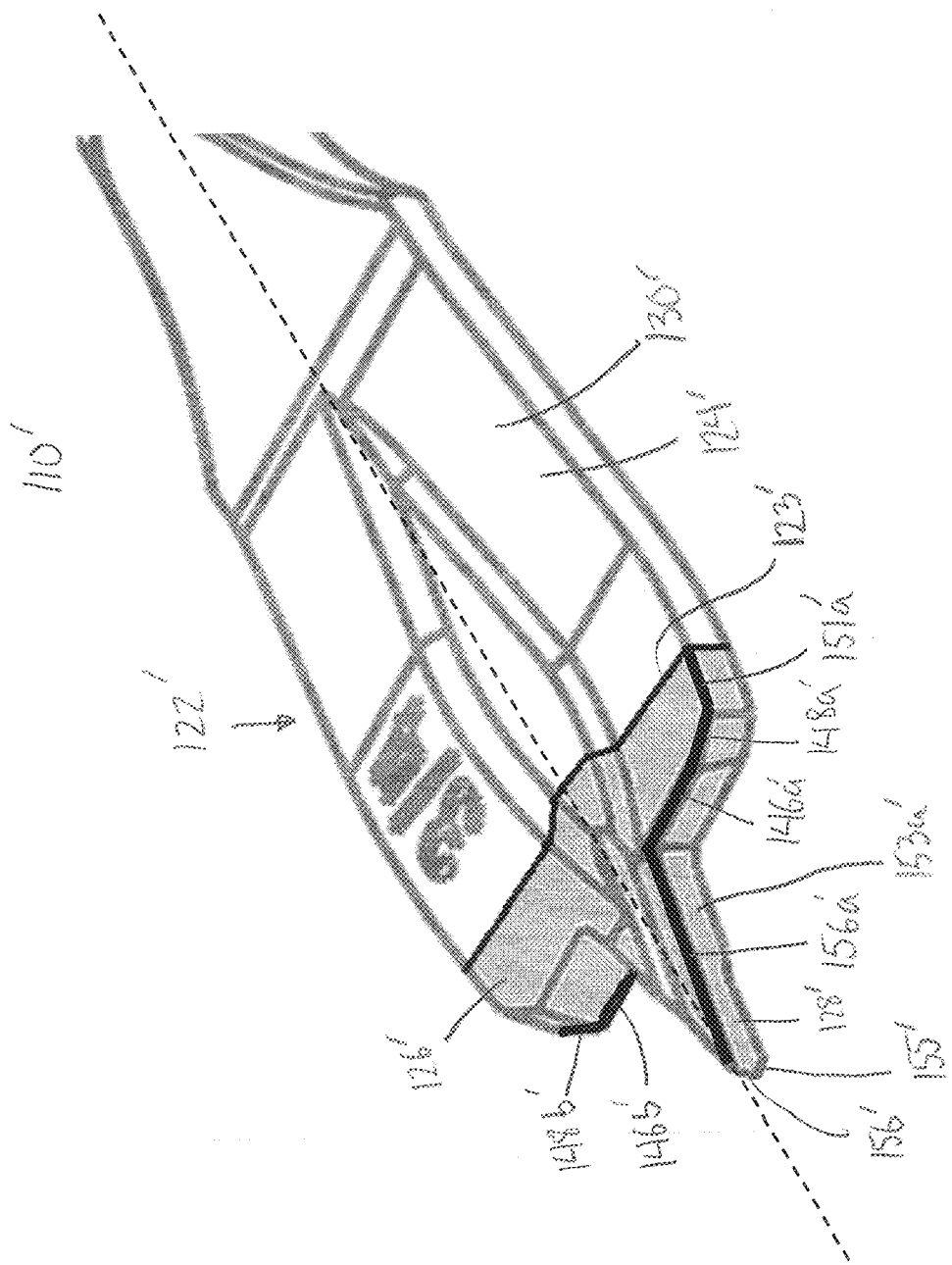
FIG. 4B is a close-up perspective view of the blade of another implementation of a spade drill bit.

Referring also to FIG. 4B, in another implementation, a spade drill bit 110' is substantially the same as the spade drill bit 110 shown in FIG. 4A with the following differences. The spade drill bit 110' includes a shank, a blade 122', and a tip 128' extending along an axis X', similar to the shank, the blade 122, and the tip 128 of FIG. 4A. The blade 122' includes a rear portion 124' coupled to the shank and a front portion 126' that includes the tip 128' and that is coupled to the rear portion 124' at a joint 123'. The front portion 124' of the blade 122' includes tip cutting edges 156*a*', 156*b*', first and second primary cutting edges 146*a*', 146*b*', optional first and second secondary cutting edges 148*a*', 148*b*', and optional first and second side cutting edges 151*a*', 151*b*'. Unlike the spade drill bit 110 of FIG. 4A, in the spade drill bit 110' of FIG. 4B, the shank and the rear portion 124' of the blade 122' may be composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.), while the front portion 126' of the blade 122', including the primary cutting edges 146*a*', 146*b*', the secondary cutting edges 148*a*', 148*b*', the tip cutting edges 156*a*', 156*b*', and/or the side cutting edges 151*a*', 15113', is/are composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The rear portion 124' may be formed integrally with the shank. The front portion 126' of the blade 122' may be joined to the rear portion 124' of the blade 122' at the joint 123', e.g., by welding or brazing. Thus, an entirety of the front portion 122*b*' of blade 122', which includes all of the cutting edges, is formed of the second, relatively hard steel alloy. The spade drill bit 110' of FIG. 4B may be manufactured in accordance with a second implementation of a manufacturing process described below.

Figure 5A:
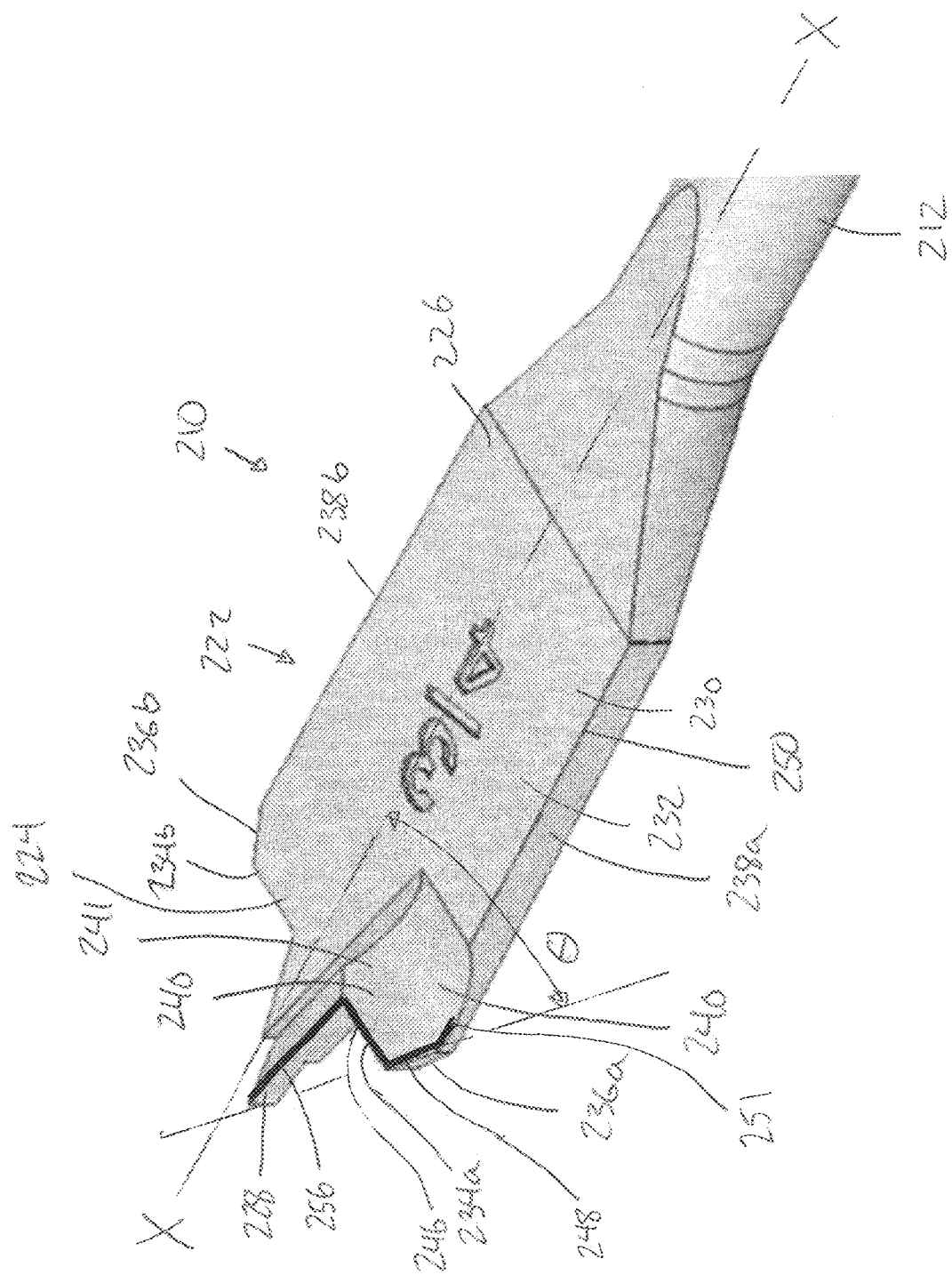
FIG. 5A is a close-up perspective view of the blade of another implementation of a spade drill bit.

Referring also to FIG. 5A, in another implementation, a spade drill bit 210 is substantially the same as the spade drill bit 10 shown in FIGS. 1-3B with the following differences. The spade drill bit 210 includes a shank 212, and a blade 222 extending axially along an axis X from the front end of the shank, which are substantially the same as the shank 10 and blade 22 except as follows. The blade 222 includes a flattened triangular tip 228 with tip cutting edges 256 (which are substantially the same as the tip 28 with tip cutting edges 56*a*, 56*b*) and a paddle portion 230 having first and second generally planar faces 232 (one shown) opposing one another. The first and second faces 232 are mirror images of one another. The paddle portion 230 is bounded by first and second shoulders 234*a*, 234*b* that extend radially outward from the tip 228 generally perpendicular to the axis X, first and second optional chamfers 236*a*, 236*b* that extend radially outward and axially rearward from the shoulders 234*a*, 234*b* at an acute angle θ (e.g., approximately 40° to approximately 50°) to the axis X, and first and second side faces 238*a*, 238*b* that extend axially rearward generally parallel or tapered inward relative the axis X, e.g., at an acute angle of approximately 1° to approximately 3°. In other implementations, the chamfers may not be present, and the first and second shoulders may be joined directly to the side faces.

The first and second faces 232 each include first and second recessed or concavely curved surfaces 240 that define first and second flutes 241, respectively, on opposite sides of the axis X. The first and second concavely curved surfaces 240 extend axially rearward from the first and second shoulders 234*a*, 234*b* along a portion of an axial length of the paddle portion 230. In one implementation the flutes 241 extend approximately 0.45 inches from the shoulders 234*a*, 234*b* or at least one quarter of the length of the blade. First and second primary cutting edges 246 are formed at junctions between the shoulders 234*a*, 234*b* and the concavely curved surfaces 240. First and second secondary cutting edges 248 are formed at junctions between the chamfers 236 and the concavely curved surfaces 240. First and second side edges 250, which may optionally include side cutting edges 251 along at least a portion of side edges 250, are formed at junctions between the side faces 238, the concavely curved surfaces 240, and the first and second generally planar faces 232 of the paddle 230. The blade 222 is composed of a first, relatively soft or mild steel alloy, such as carbon steel or low alloy carbon steel (e.g., SAE 1065, SAE 1060, SAE4140, SAE 52100, SAE 1045, etc.). One or more of the primary cutting edges 246, the secondary cutting edges 248, the side cutting edges 251, and the tip cutting edges 252 is/are composed of a second, relatively hard steel alloy, such as a high chromium steel (e.g., DIN 85555 SG-6-60-GTZ, WSG 3-GZ-55-ST, DIN 8555 SG 4-60-S, etc.) or a high speed steel or tool steel (e.g., SAE M2, M7, M52, M50, M7, S7, Calmax, etc.).

Each of the concavely curved surfaces 240 has a first portion 241 closer to a front portion 226 of the blade 222 with a first radius of curvature R1 (e.g., between approximately 0.3 inches and approximately 0.5 inches, such as approximately 0.4 inches). Each concavely curved surface also has a second portion 243 closer to a rear portion 224 of the blade 222 with a second radius of curvature R2 (e.g., between approximately 0.3 inches and approximately 0.5 inches, such as approximately 0.4 inches). In one implementation, the second radius R2 is equal to the first radius R1. The flutes 241 facilitate the removal of chips from a bore being cut and increase the drilling rate and decrease the power required to drill the bore. The concavely curved surfaces 240 may have a smooth profile with no sharp corners or flat surfaces. The flutes 241 may have a configuration substantially similar to the flutes 50, 52 disclosed in U.S. Pat. No. 8,147,174, which is incorporated by reference.

Figure 5B:
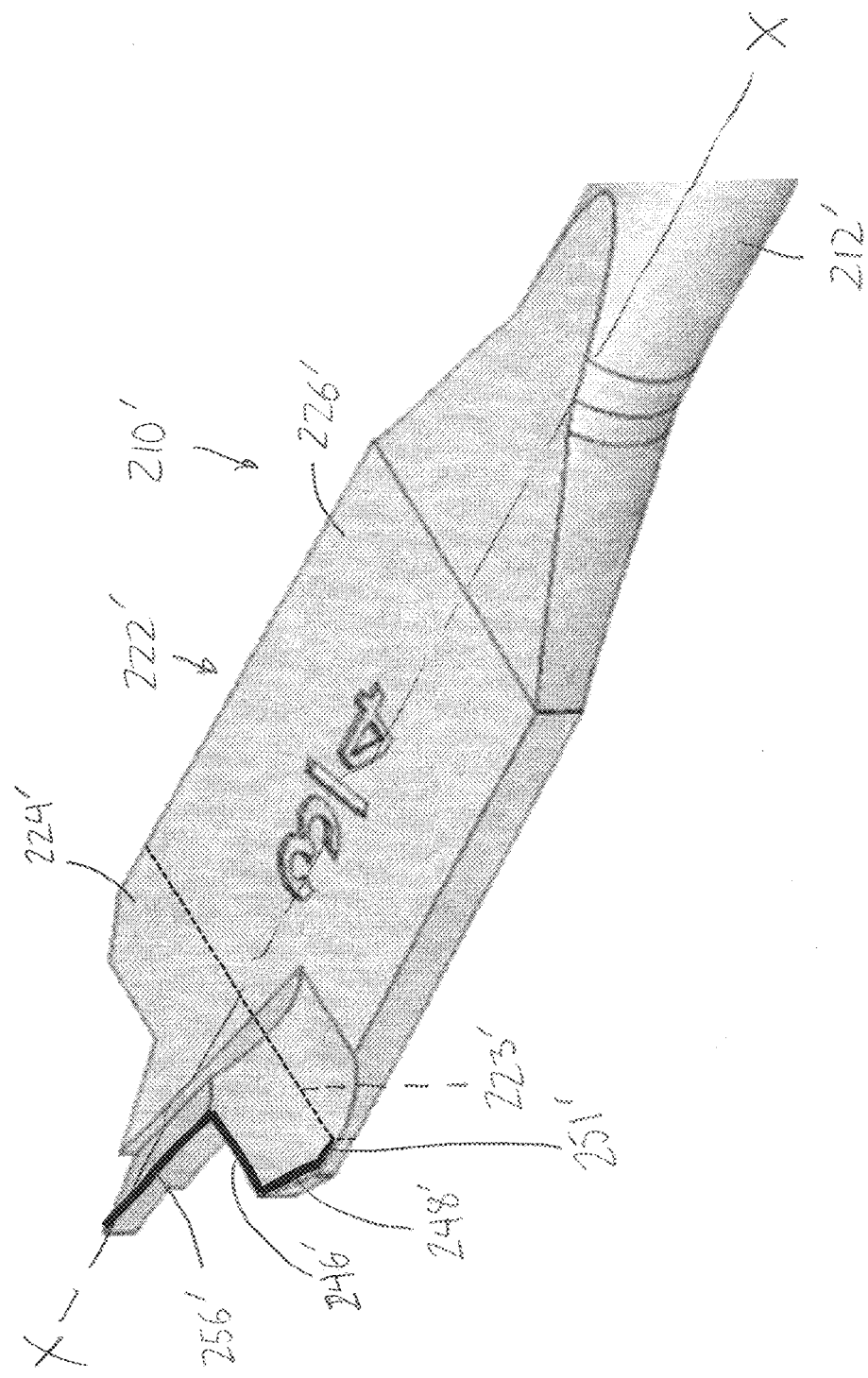
FIG. 5B is a close-up perspective view of the blade of another implementation of a spade drill bit.

Referring also to FIG. 5B, in another implementation, a spade drill bit 210' is substantially the same as the spade drill bit 210 shown in FIG. 5A with the following differences. The spade drill bit 210' includes a shank 212', a blade 222', and a tip 228' extending along an axis X', similar to the shank 212, the blade 222, and the tip 228 of FIG. 5A. The blade 222' includes a rear portion 224' coupled to the shank and a front portion 226' that includes the tip 228' and that is coupled to the rear portion 224' at a joint 223'. The front portion 224' of the blade 222' includes tip cutting edges 256', primary cutting edges 246', secondary cutting edges 248' and optional side cutting edges 251'. Unlike the spade drill bit 210 of FIG. 5A, in the spade drill bit 210' of FIG. 5B, the shank 212' and the rear portion 224' of the blade 222' may be composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.), while the front portion 226' of the blade 222', including the primary cutting edges 246', the secondary cutting edges 248', the side cutting edges 251', and the tip cutting edges 256' is/are composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The rear portion 224' may be formed integrally with the shank 212'. The front portion 226' may be joined to the rear portion 224' at a joint 223', e.g., by welding or brazing. Thus, an entirety of the front portion 226' of blade 222', which includes all of the cutting edges, is formed of the second, relatively hard steel alloy. The spade drill bit 210' of FIG. 5B may be manufactured in accordance with a second implementation of a manufacturing process described below.

Figure 6A:
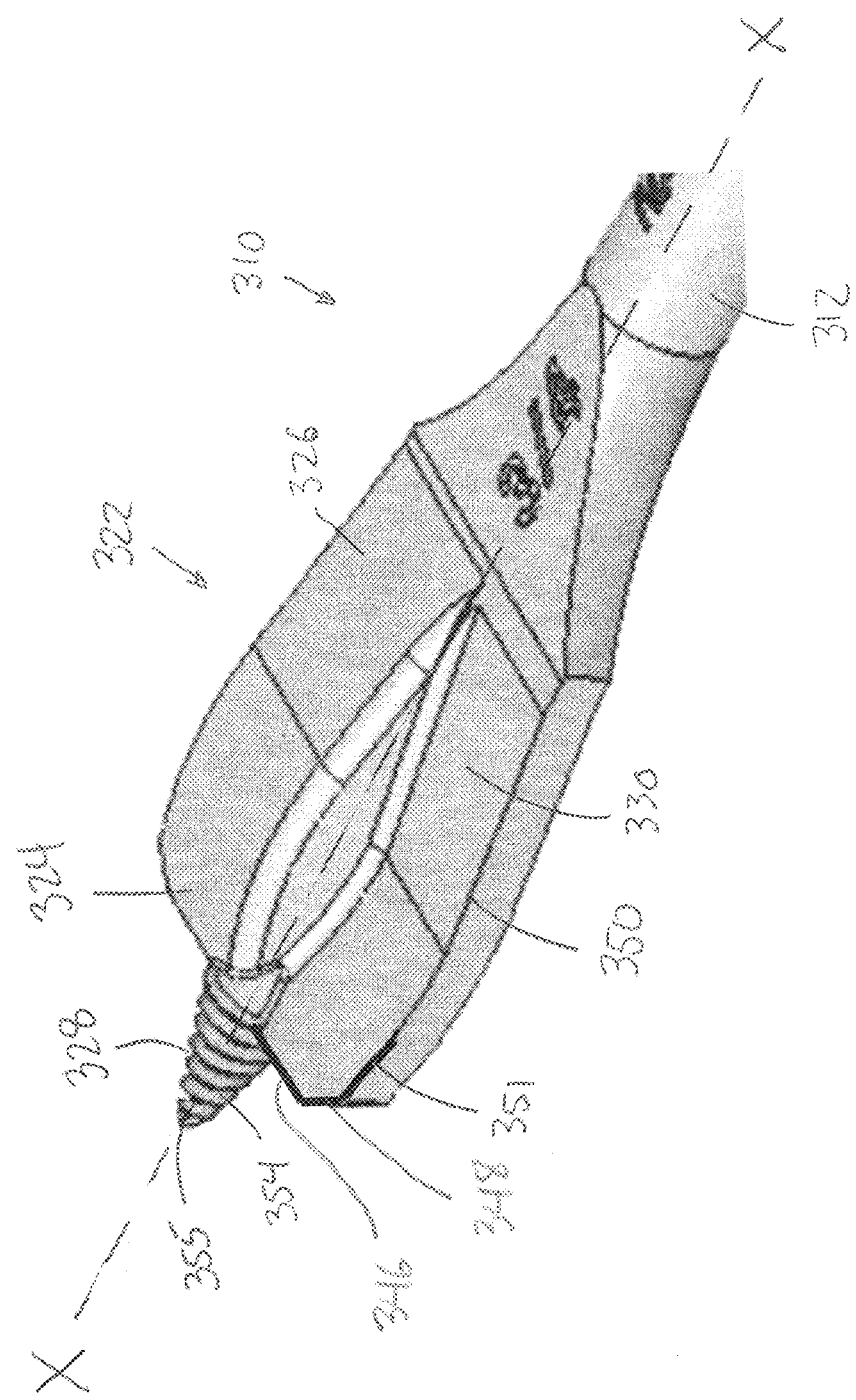
FIG. 6A is a close-up perspective view of the blade of another implementation of a spade drill bit.

Referring also to FIG. 6A, in another implementation, a spade drill bit 310 is substantially the same as the spade drill bit 10 shown in FIGS. 1-3B with the following differences. The spade drill bit 310 includes a shank 312 and a blade 322 extending axially along an axis X from the front end of the shank, which are substantially the same as the shank 10 and blade 22 except as follows. The blade 322 includes a paddle portion 330 (which is substantially the same as paddle portion 30) with a rear portion 326 portion coupled to the shank 312 and a tip 328 that extends from a center of the front portion 324 of the paddle portion 330 along the axis X. The tip 328 has a generally conical or frustroconical shape that is threaded with threads 354 along a least a portion of the tip 328. The tip 328 terminates in an apex 355, which may be a blunt tip or may have a sharp point. The threads on the point 328 of the spade drill bit 310 may facilitate drawing the spade drill bit into the workpiece for increased cutting speed and/or energy efficiency.

Like the spade drill bit 10 of FIGS. 1-3B, the shank 312 and the blade 322 of spade drill bit 310 are composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). The blade 322 also includes one or more of primary cutting edges 446, optional secondary cutting edges 348, and/or side cutting edges 351 formed along at least a portion of side edges 350. Each of the cutting edges composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The second steel alloy that forms the cutting edge(s) may be attached to the first steel alloy of the blade, e.g., by welding a bead or strip of the second steel alloy to the first steel alloy along the cutting edges, as further described in a first implementation of a manufacturing process described below. Other features of the spade drill bit 310 are substantially the same as the spade drill bit 10 of FIGS. 1-3B.

Figure 6B:
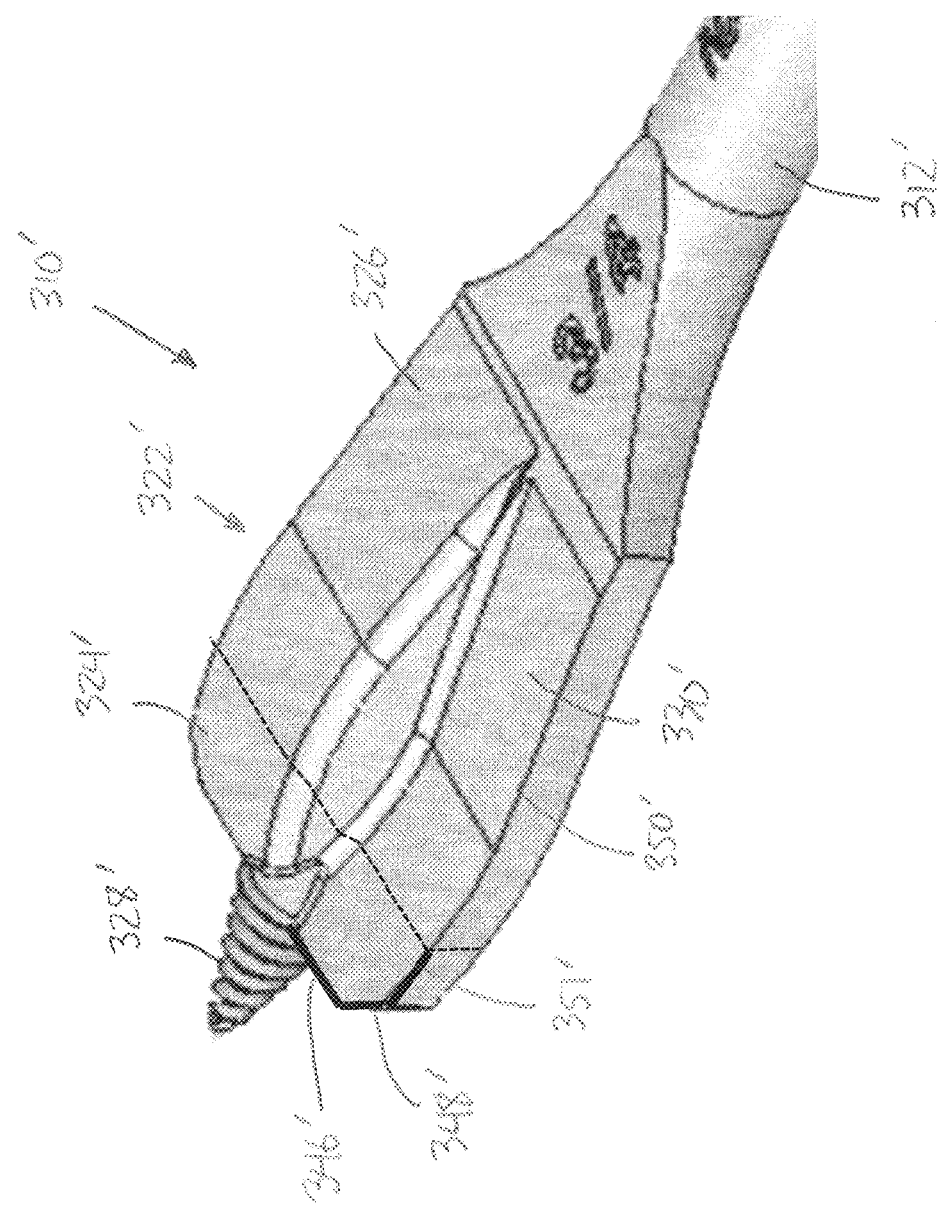
FIG. 6B is a close-up perspective view of the blade of another implementation of a spade drill bit.

Referring also to FIG. 6B, in another implementation, a spade drill bit 310' is substantially the same as the spade drill bit 310 shown in FIG. 6A with the following differences. The spade drill bit 310' includes a shank 312', a blade 322', and an at least partially threaded tip 328' extending along an axis X', similar to the shank 312, the blade 322, and the tip 328 of FIG. 4A. The blade 322' includes a rear portion 324' coupled to the shank 312' and a front portion 126' that includes the tip 328' and that is coupled to the rear portion 324' at a joint 323'. The front portion 224' includes primary cutting edges 346', secondary cutting edges 348', and optional side cutting edges 351'. The shank 312' and the rear portion 324' of the blade 322' may be composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). The front portion 326' of the blade 322', including the primary cutting edges 346', the secondary cutting edges 348', and/or the optional side cutting edges 351', is/are composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The rear portion 324' may be formed integrally with the shank 312'. The front portion 326' of the blade 322' may be joined to the rear portion 324' at the joint 323', e.g., by welding or brazing. Thus, an entirety of the front portion 324' of blade 322', which includes all of the cutting edges, is formed of the second, relatively hard steel alloy. The spade drill bit 310' of FIG. 4B may be manufactured in accordance with a second implementation of a manufacturing process described below.

Figure 7A:
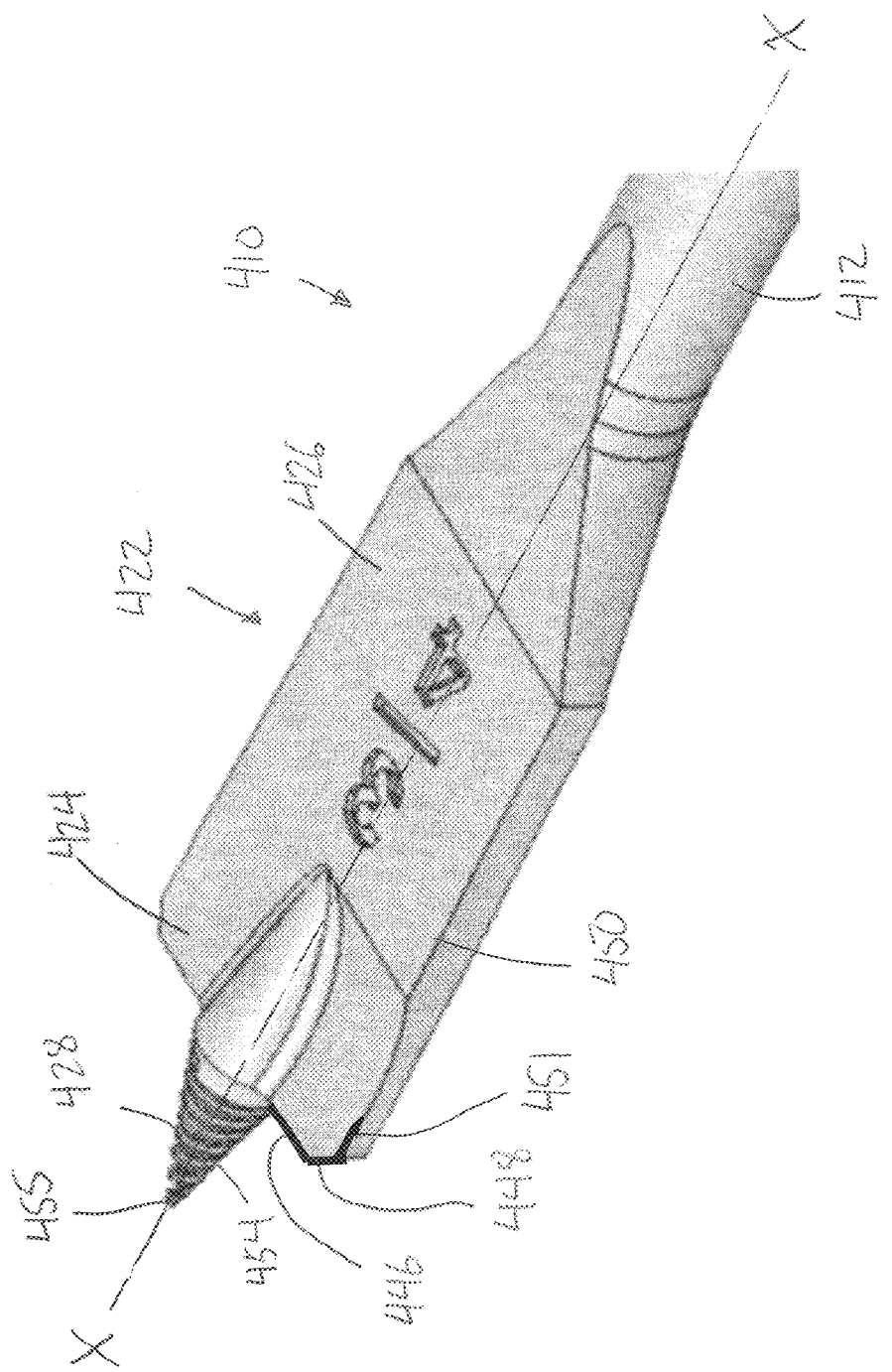
FIG. 7A is a close-up perspective view of the blade of another implementation of a spade drill bit.

Referring also to FIG. 7A, in another implementation, a spade drill bit 410 is substantially the same as the spade drill bit 210 shown in FIG. 5A with the following differences. The spade drill bit 410 includes a shank 412 and a blade 422 extending axially along an axis X from the front end of the shank, which are substantially the same as the shank 210 and blade 222 except as follows. The blade 422 includes a paddle portion 430 (which is substantially the same as paddle portion 230) and a tip 428 that extends from a center of the front portion 424 of the paddle portion 430 along the axis X. The tip 428 has a generally conical or frustroconical shape that is threaded with threads 454 along a least a portion of the tip 428. The tip 428 terminates in an apex 455, which may be a blunt tip or may have a sharp point. The threads on the point 428 of the spade drill bit 410 may facilitate drawing the spade drill bit into the workpiece for increased cutting speed and/or energy efficiency.

Like the spade drill bit 210 of FIG. 5A, the shank 412 and the blade 422 of spade drill bit 410 are composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). The blade 422 also includes one or more of primary cutting edges 446, optional secondary cutting edges 448, and/or side cutting edges 451 formed along at least a portion of side edges 450. Each of the cutting edges composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The second steel alloy that forms the cutting edge(s) may be attached to the first steel alloy of the blade, e.g., by welding a bead or strip of the second steel alloy to the first steel alloy along the cutting edges, as further described in a first implementation of a manufacturing process described below. Other features of the spade drill bit 410 are substantially the same as the spade drill bit 210 of FIG. 5A.

Figure 7B:
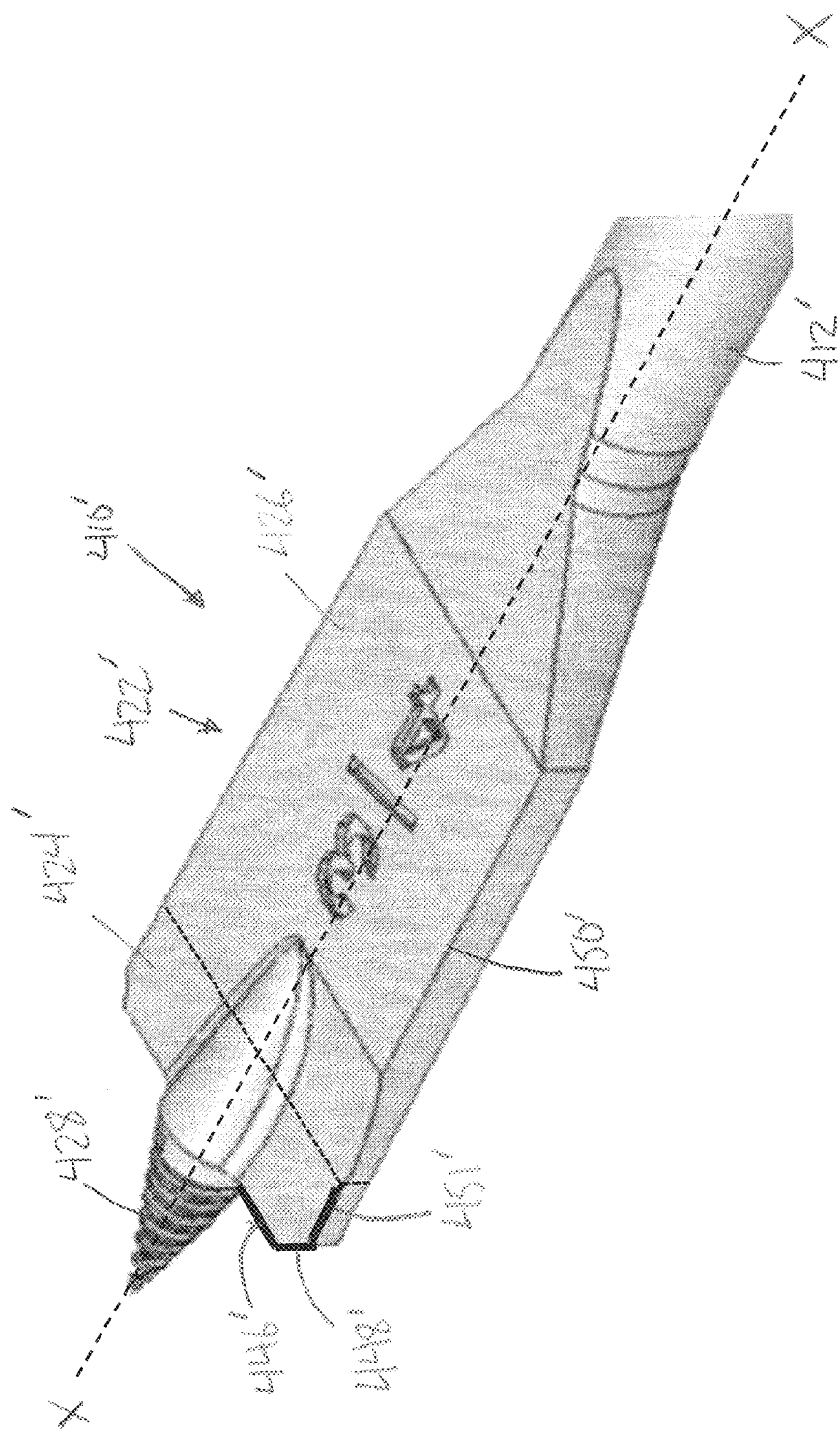
FIG. 7B is a close-up perspective view of the blade of another implementation of a spade drill bit.

Referring also to FIG. 7B, in another implementation, a spade drill bit 410' is substantially the same as the spade drill bit 410 shown in FIG. 7A with the following differences. The spade drill bit 410' includes a shank 412', a blade 422', and an at least partially threaded tip 428' extending along an axis X', similar to the shank 412, the blade 422, and the tip 428 of FIG. 7A. The blade 422' includes a rear portion 424' coupled to the shank and a front portion 426' that includes the tip 428' and that is coupled to the rear portion 424' at a joint 423'. The front portion 424' of the blade 422' includes primary cutting edges 446', secondary cutting edges 448' and optional side cutting edges 451'. The shank 412' and the rear portion 424' of the blade 422' may be composed of a first, relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). The front portion 426' of the blade 422', including the primary cutting edges 446', the secondary cutting edges 448', the side cutting edges 451' is/are composed of a second, relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). The rear portion 424' may be formed integrally with the shank 412'. The front portion 426' may be joined to the rear portion 424' at a joint 423', e.g., by welding or brazing. Thus, an entirety of the front portion 426' of blade 422', which includes all of the cutting edges, is formed of the second, relatively hard steel alloy. The spade drill bit 410' of FIG. 7B may be manufactured in accordance with a second implementation of a manufacturing process described below.

Figure 8:
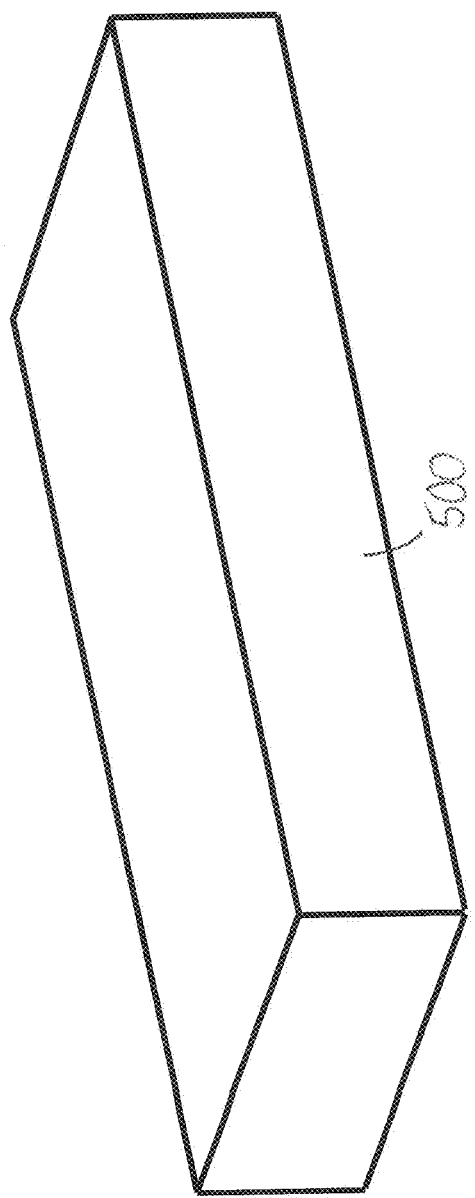
FIG. 8 is a perspective view of blank of bar stock in accordance with a first manufacturing process for spade drill bits.
Figure 9:
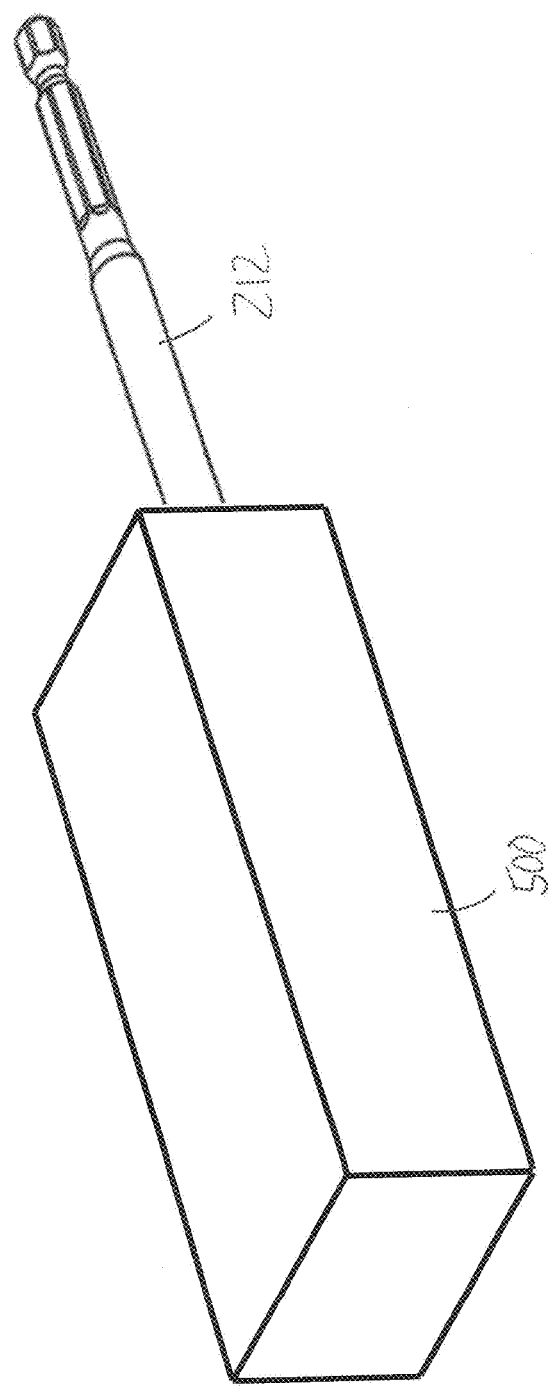
FIG. 9 is a perspective view of the blank of bar stock of FIG. 8 formed with a shank of a spade drill bit in accordance with the first manufacturing process for spade drill bits.
Figure 10:
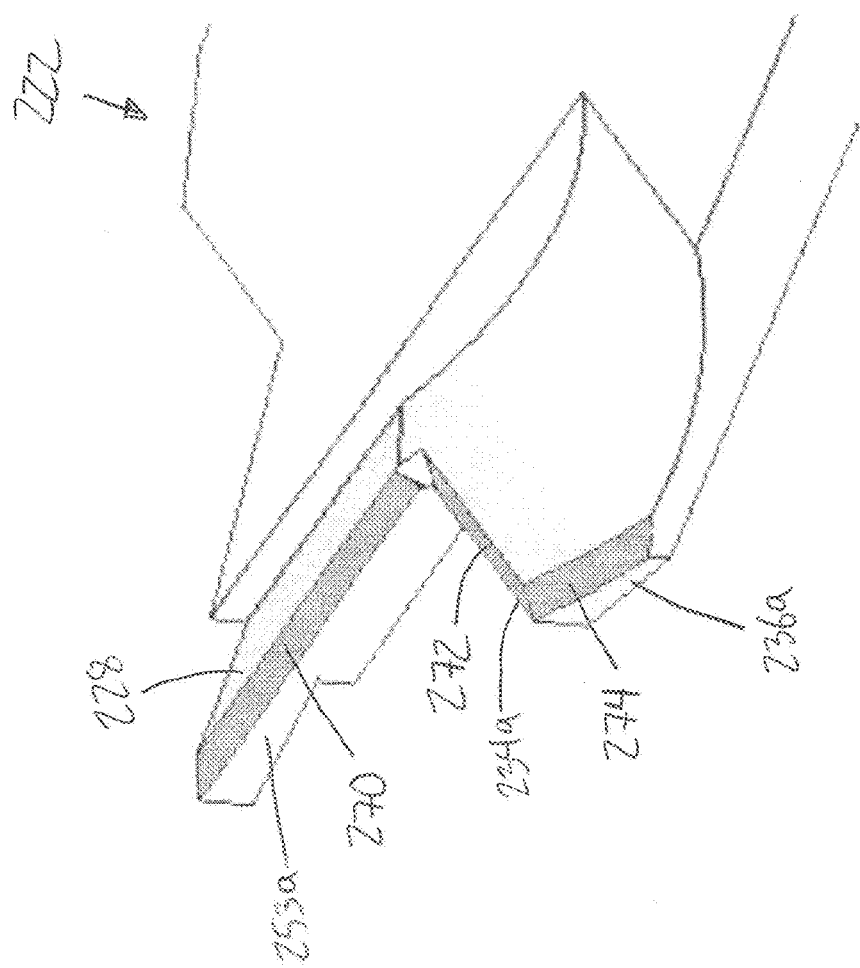
FIG. 10 is a close-up perspective view of a blade formed in the remaining bar stock of FIG. 9 in accordance with a first manufacturing process for spade drill bits.
Figure 12:
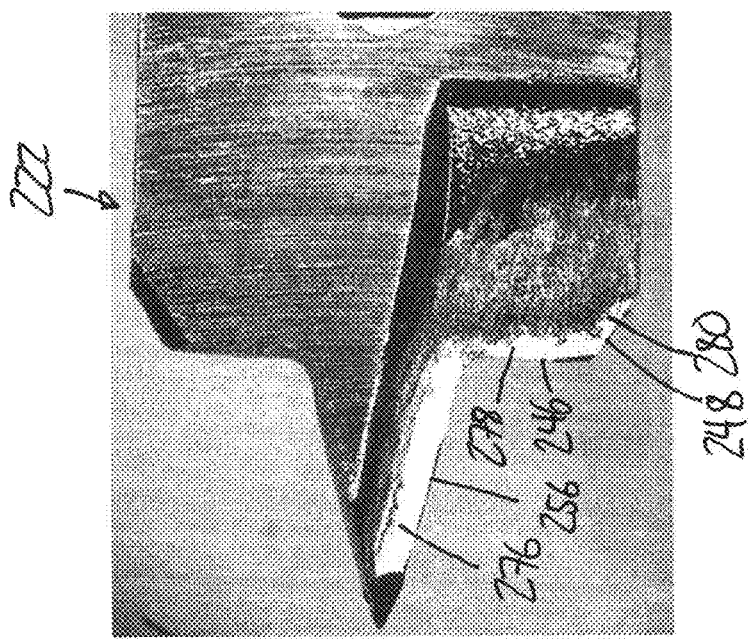
FIG. 12 is a top view of the blade of FIG. 10 after forming cutting edges in the bead of the second steel alloy in accordance with a first manufacturing process for spade drill bits.
Figure 11:
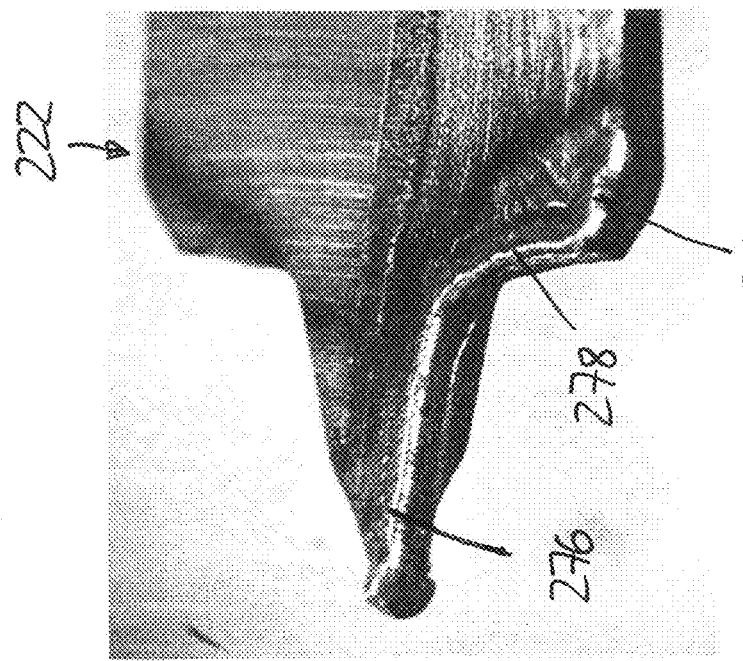
FIG. 11 is a top view of the blade of FIG. 10 with a bead of a second steel alloy welded to the blade in accordance with a first manufacturing process for spade drill bits.

Referring also to FIGS. 8-12, in an implementation, the spade bits 10, 110, 210, 310, 410, described above with respect to FIGS. 1-3B, 4A, 5A, 6A, and 7A can be manufactured according to the following process. The process will be described with respect to the spade drill bit 210 shown in FIG. 5A. However, it should be understood that a similar manufacturing process may be used to make the other spade drill bits 10, 110, 310, 410, described in FIGS. 1-3B, 4A, 6A, and 7A of this application. Referring to FIG. 8, an elongated blank 500 (e.g., a rectangular prism, cylindrical, or other shaped ingot) may be formed e.g., by casting. The blank 500 is composed of the first soft or mild steel alloy, such as a carbon steel or low alloy carbon steel (e.g., SAE 1065, SAE 1060, SAE 1045, SAE 4140, SAE 5140, SAE 4340, SAE 1045, etc.). Referring also to FIG. 9, next, the shank portion 212 may be formed in one end portion 502 of the blank 500, e.g., by cold forming. Referring also to FIG. 9, the blade portion 222 may be formed in an opposite end portion 504 of the blank 500, e.g., by hot forging or stamping. The blade 222, as formed, may have beveled surfaces 270, 272, 274 formed into the tip side faces 253a, 253b, the front shoulders 234a, 234b, and the chamfers 236a, 236b, respectively, where the tip cutting edges 256, the primary cutting edges 246, and the secondary cutting edges 248 will be. After the shank 212 and the blade 222 are formed, the spade drill bit 210 may be heat treated one or more times, e.g., by induction heating and cooling. Following heat treatment, any oxide layer on the spade drill bit may be removed, e.g., by shot blasting. Referring also to FIG. 11, beads 276, 278, 280 of a second relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.), are coupled or affixed to the beveled surfaces 270, 272, 274, respectively, e.g., by welding (such as by resistance welding, laser welding, or TIG welding) or brazing. The bead 272 also may be deburred to remove any excess weld material. Referring also to FIG. 12, the bead 272 is then machined to sharpen the bead 272 and form the cutting tip cutting edges 256, the primary cutting edges 246, and the secondary cutting edges 248.

Figure 13A:
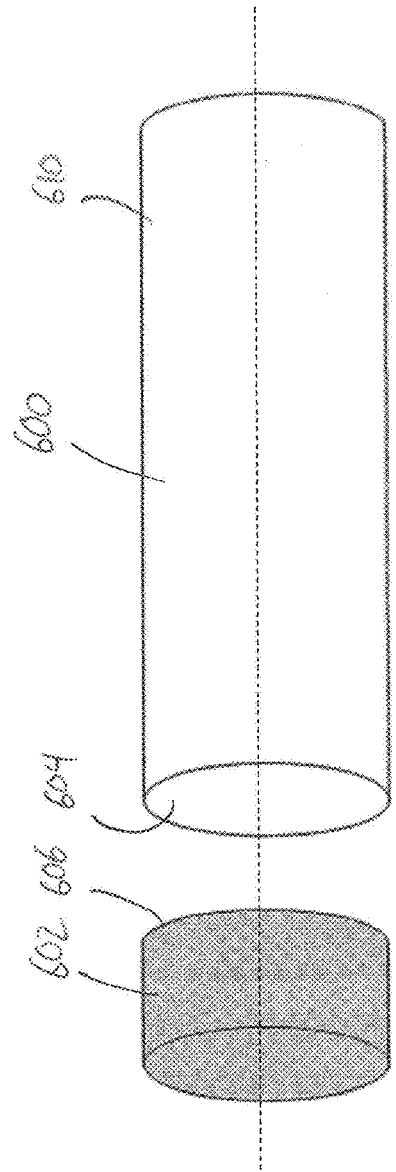
FIG. 13A is a perspective view of blanks of bar stock in accordance with a second manufacturing process for spade drill bits.
Figure 13B:
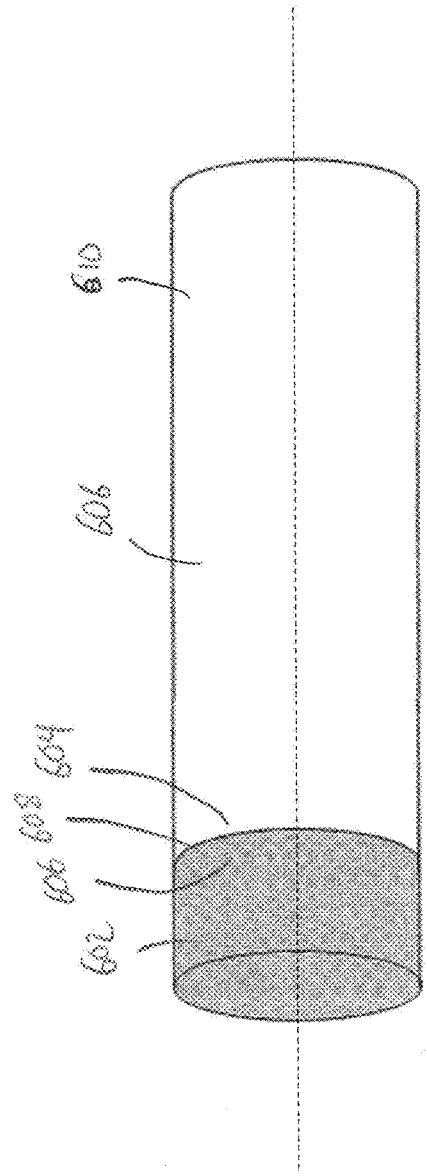
FIG. 13B is a perspective view of the blanks of bar stock of FIG. 13A joined to one another in accordance with the second manufacturing process for spade drill bits.
Figure 13C:
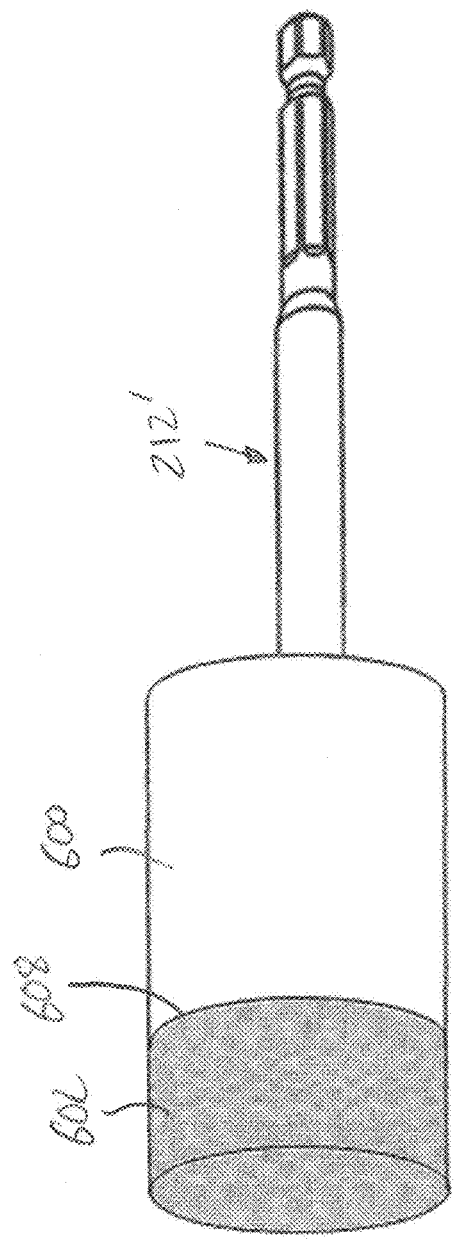
FIG. 13C is a perspective view of the joined blank of bar stock of FIG. 13B formed with a shank of a spade drill bit in accordance with the second manufacturing process for spade drill bits.
Figure 13D:
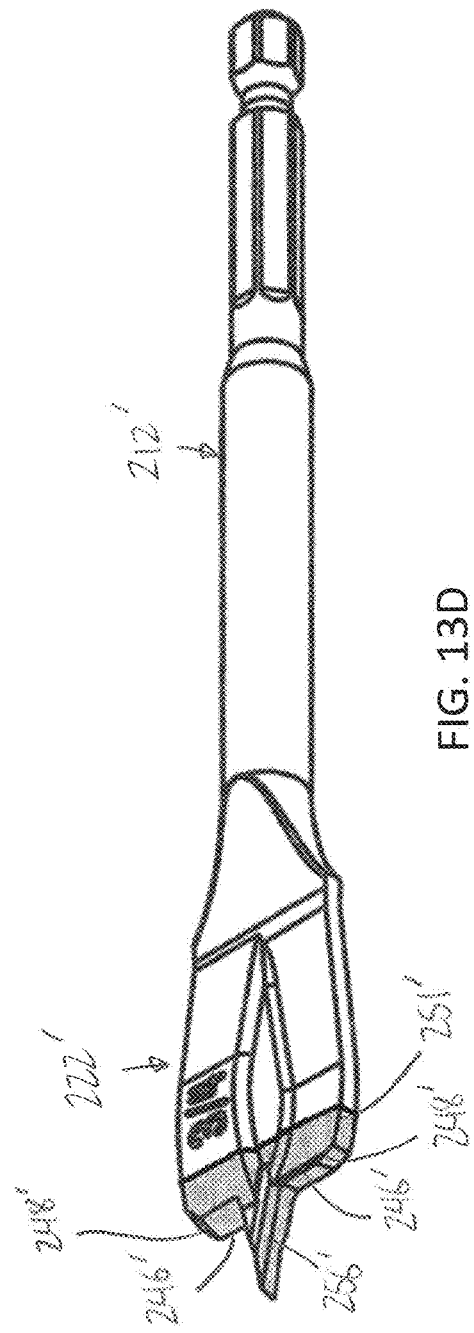
FIG. 13D is a perspective view of the joined blank of bar stock of FIG. 13B formed with the shank, the blade, and the tip of a spade drill bit in accordance with the second manufacturing process for spade drill bits.

Referring also to FIGS. 13A-13D, in another implementation, the spade bits 10', 110', 210', 310', 410', described above with respect to FIGS. 3C, 4B, 5B, 6B, and 7B can be manufactured according to the following process. The process will be described with respect to the spade drill bit 210' shown in FIG. 5B. However, it should be understood that a similar manufacturing process may be used to make the other spade drill bits 10', 110', 310', 410', described in FIGS. 3C, 4B, 6B, and 7B of this application. Referring to FIG. 13A, a first elongated blank 600 (e.g., a rectangular, cylindrical, or other shaped ingot) is formed (e.g., by casting) from a first relatively soft or mild steel alloy, such as a carbon steel or low alloy carbon steel (e.g., SAE 1065, SAE 1060, SAE 1045, SAE 4140, SAE 5140, SAE 4340, SAE 1045, etc.). A second blank 602 (e.g., a rectangular, cylindrical, or other shaped ingot), is formed (e.g., by casting) from a relatively hard steel alloy, such as a high chromium steel (e.g., DIN 85555 SG-6-60-GTZ, WSG 3-GZ-55-ST, DIN 8555 SG-4-60-S, etc.) or a high speed steel or tool steel (e.g., SAE M2, M7, M52, M7, M50, S7, Calmax, etc.). Referring also to FIG. 13B, a front end portion 604 of the first blank 600 is joined to the rear end portion 606 of the second blank 602 at a joint 608, e.g., by welding (such as by resistance welding, laser welding, or TIG welding) or brazing. Referring also to FIG. 13C, the shank portion 212' of FIG. 5B may be formed in a rear end portion 610 of the first blank 600, e.g., by cold forming. Referring also to FIG. 13D, the blade portion 222' and tip 228' of FIG. 5B may be formed in the front end portion 604 of the first blank 600 and the second blank 602, e.g., by hot forging or stamping. After the shank 212' and the blade 222' are formed, the spade drill bit 210' may be heat treated one or more times, e.g., by induction heating and cooling. Following heat treatment, any oxide layer on the spade drill bit may be removed, e.g., by shot blasting. The edges of the blade portion 222' then may be machined to form and sharpen tip cutting edges 256', the primary cutting edges 246', the secondary cutting edges 248', and optionally the side cutting edges 251', as described with respect to FIG. 5B.

Figure 14:
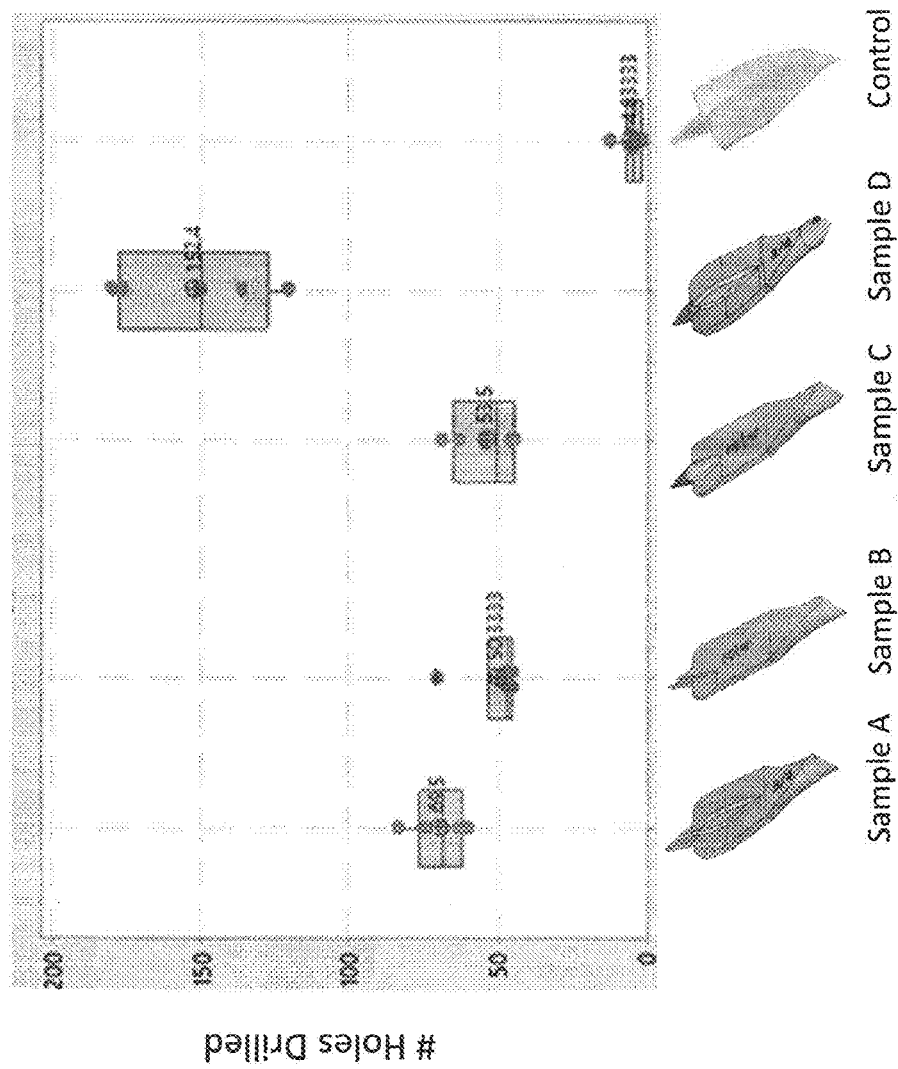
FIG. 14 is a bar graph illustrating life of the samples of spade drill bits of the present application as compared to a control group when cutting holes in nail embedded wood.
Figure 15:
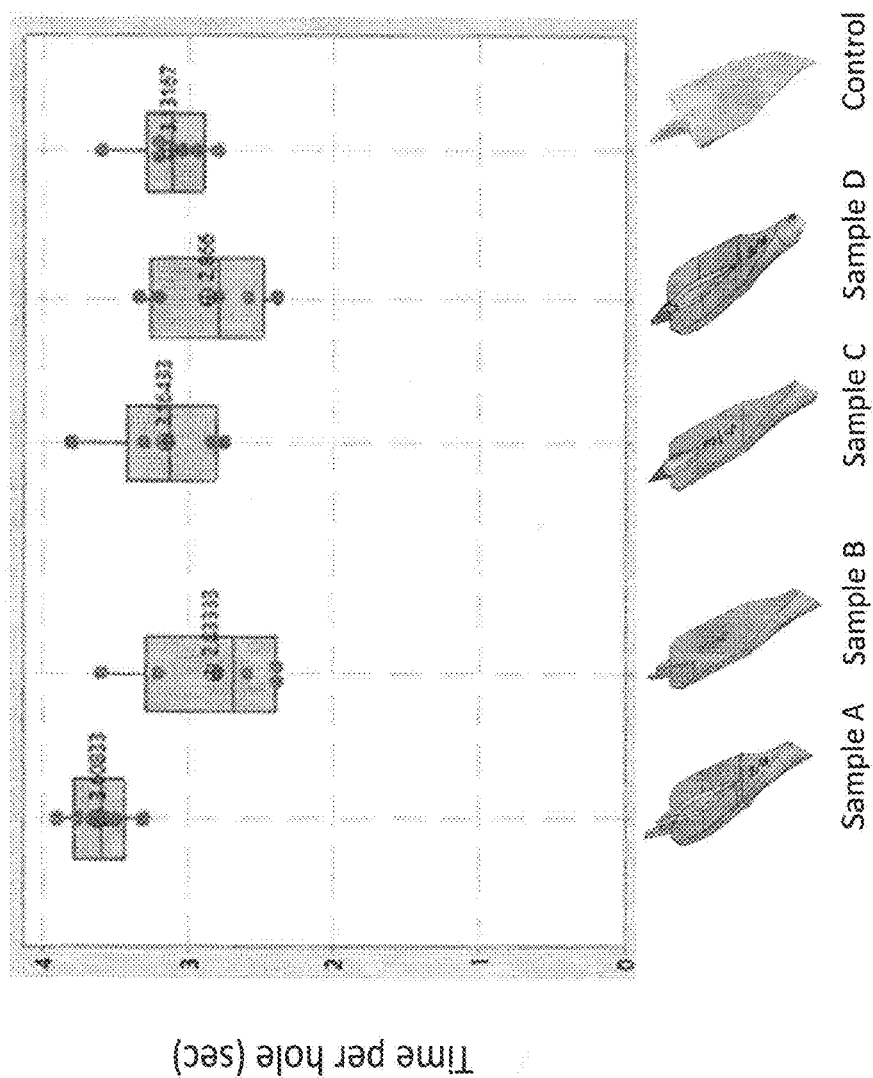
FIG. 15 is a bar graph illustrating cutting speed of samples of spade drill bits of the present application as compared to a control group when cutting holes in wood without embedded nails.

Referring to FIGS. 14 and 15, the spade drill bits described above unexpectedly have significantly greater life when drilling holes in wood embedded with nails, while maintaining cutting speed when drilling holes wood without embedded nails. Sample Groups A, B, C, and D of spade drill bits having substantially the same designs as spade drill bits 10/10', 210/210', 310/310', and 410/410', respectively, were compared to a Control Group containing samples of Bosch® Nailstrike ¾-inch spade drill bits (model no. N51009), a leading spade drill bit for drilling holes in nail embedded wood. The spade drill bits in the Control Group have a design substantially similar to the design of the spade drill bit disclosed in U.S. Pat. No. 9,724,764, which is incorporated by reference. The spade drill bits in the Control Group each have their cutting edges formed from the same low alloy carbon steel as the rest of their blade portions. The spade bits in Sample Groups A, B, C, and D each were manufactured in accordance with the manufacturing process described above, with their cutting edges formed from a second steel alloy that has a greater hardness than the first steel alloy of the rest of the blade.

Spade drill bits in the Control Group and in Sample Groups A, B, C, and D were evaluated in a life test for drilling holes in nail embedded wood. The life test in nail embedded is performed using a power drill which is attached to a test rig. The power drill spins at approximately 1200 RPM and a fixed load of 77 lbs. is applied on the power drill as a constant feed force. The drilling test is made on a 1⅜"×4" pine board with 10d/16d size nails embedded. The number of holes each drill bit can form is recorded.

It was expected that the spade drill bits in Sample Groups A, B, C, and D would have longer life in nail embedded wood (e.g., approximately 2× to 5× greater life). However, as shown in FIG. 14, the spade drill bits in Sample Groups A, B, C, and D had significantly longer than expected life than the spade drill bits in the Control Group when drilling holes in nail embedded wood. The spade drill bits in the Control Group were able to drill, on average, 4.83 holes in nail embedded wood before reaching the end of their useful life. By comparison, the spade drill bits in Sample Groups A, B, C, and D were able to drill, on average 69.5 holes, 50.3 holes, 53.5 holes, and 152.4 holes, respectively, in nail embedded wood before reaching the end of their useful life. Thus, the spade drill bits in Sample Groups A, B, C, and D had a greater than 14×, 10×, 11×, and 31× increase in life, respectively, as compared to the spade drill bits in the Control Group, which was far higher than expected.

Spade drill bits in the Control Group and in Sample Groups A, B, C, and D were evaluated in a cutting speed test for drilling holes in wood without embedded nails. The speed test is performed using a power drill which is attached to a test rig. The power drill spins at approximately 1200 RPM and a fixed load of 37 lbs. is applied on the power drill as a constant feed force. The drilling test is made on a 2×4 pine board without embedded nails. The average time it takes to form the first 10 holes is measured to determine the speed, with a shorter time indicating a higher drilling speed.

It was expected that the spade drill bits in Sample Groups A, B, C, and D would have slower drilling speed in nail-free wood, due to their being more robust and having a longer life in nail-embedded wood. However, as shown in FIG. 15, the spade drill bits in Sample Groups A, B, C, and D had similar cutting speed as the spade drill bits in the Control Group when drilling holes in nail-free wood. The spade drill bits in the Control Group were able to drill each hole in 3.13 seconds, on average. By comparison, the spade drill bits in Sample Groups A, B, C, and D were able to drill each hole in 3.61 seconds, 2.83 seconds, 3.16 seconds, and 2.87 seconds, on average, respectively. Thus, the spade drill bits in Sample Groups A, B, C, and D had a cutting speed that was approximately the same as the spade drill bits in the Control Group, which was faster than expected, especially when considering the significant increase in life when drilling holes in nail embedded wood.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A spade drill bit comprising:
   a shank extending along an axis from a rear end to a front end, the rear end configured to be coupled to a tool holder of a power tool;
   a blade including a paddle extending along the axis with a front portion and rear portion coupled to the front end of the shank;
   a tip coupled to the front portion of the paddle and extending along the axis; and
   first and second primary cutting edges disposed on a front edge of the front portion of the paddle and extending radially outward from the tip,
   wherein the paddle includes a first face with a first concave surface and a first convex surface on opposite sides of the axis, and a second face opposite the first face with a second concave surface and a second convex surface on opposite sides of the axis, the first concave surface opposite the first convex surface and the second concave surface opposite the second convex surface,
   wherein the first concave surface has a first portion closer to the first primary cutting edge with a first radius of curvature and a second portion closer to the rear portion with a second radius of curvature that is greater than the first radius of curvature,
   wherein the rear portion of the paddle is composed of a first steel alloy, and
   wherein the front portion of the paddle is composed of a second steel alloy that has a greater hardness than the first steel alloy.

2. The spade drill bit of claim 1, wherein each concave surface and each convex surface extend along substantially an entirety of an axial length of the paddle.

3. The spade drill bit of claim 1, wherein the tip is generally flat and triangular with a first tip cutting edge extending forward from the first primary cutting edge and toward the axis, and a second tip cutting edge extending forward from the second primary cutting edge and toward the axis.

4. The spade drill bit of claim 1, wherein the tip is frustoconical and at least partially threaded.

5. The spade drill bit of claim 1, wherein the front portion of the paddle further comprises first and second secondary cutting edges tapering radially outward from the primary cutting edges and axially rearward toward the rear portion.

6. The spade drill bit of claim 1, further comprising side cutting edges extending axially rearward at least partially along side edges of the paddle.

7. The spade drill bit of claim 1, wherein the primary cutting edges are affixed to the front edge of the paddle.

8. The spade drill bit of claim 1, wherein the front portion is composed of the second steel alloy, is affixed to the rear portion at a joint, and includes the primary cutting edges.

9. The spade drill bit of claim 1, wherein the first steel alloy comprises carbon steel alloy or low alloy carbon steel and wherein the second steel alloy comprises a high chromium steel alloy or a high speed steel or tool steel alloy.

10. The spade drill bit of claim 1, wherein the second concave surface has a first portion closer to the second primary cutting edge with the first radius of curvature and a second portion closer to the rear portion with the second radius of curvature that is greater than the first radius of curvature.

11. A spade drill bit comprising: a shank extending along an axis from a rear end to a front end, the rear end configured to be coupled to a tool holder of a power tool; a blade including a paddle extending along the axis with a front portion and rear portion coupled to the front end of the shank; a tip coupled to the front portion of the paddle and extending along the axis; first and second primary cutting edges disposed on a front edge of the front portion of the paddle and extending radially outward from the tip; and first and second secondary cutting edges disposed on first and second chamfered corner edges of the front portion of the paddle, the first and second chamfered corner edges tapering radially outward and axially rearward from the first and second primary cutting edges toward the rear portion, wherein at least the rear portion of the paddle is composed of a first steel alloy, wherein the primary and secondary cutting edges are composed of a second steel alloy that has a greater hardness than the first steel alloy, wherein the paddle includes a first flat face with a first recessed surface extending rearward from the first primary cutting edge along at least a portion of the paddle, and a second flat face opposite the first face extending rearward from the second primary cutting edge along at least a portion of the paddle, the second recessed surface on an opposite side of the axis from the first recessed surface, and wherein each of the recessed surfaces is concavely curved with a first portion closer to the front edge of the paddle with a first radius of curvature and a second portion closer to the rear portion of the paddle with a second radius of curvature that is different from the first radius of curvature.

12. The spade drill bit of claim 11, wherein the paddle includes a first face with a first concave surface and a first convex surface on opposite sides of the axis, and a second face opposite the first face with a second concave surface and a second convex surface on opposite sides of the axis, the first concave surface opposite the first convex surface and the second concave surface opposite the second convex surface.

13. The spade drill bit of claim 12, wherein each concave surface and each convex surface extend along an entirety of an axial length of the paddle.

14. The spade drill bit of claim 11, wherein the tip is generally flat and triangular with a first tip cutting edge extending forward from the first primary cutting edge and toward the axis, and a second tip cutting edge extending forward from the second primary cutting edge and toward the axis.

15. The spade drill bit of claim 11, wherein the tip is frustoconical and at least partially threaded.

16. The spade drill bit of claim 11, further comprising side cutting edges extending axially rearward from the first and second secondary cutting edges at least partially along side edges of the paddle.

17. The spade drill bit of claim 11, wherein the front portion is composed of the first steel alloy and the primary cutting edges and the secondary cutting edges are affixed to the front edge of the paddle.

18. The spade drill bit of claim 11, wherein the front portion is composed of the second steel alloy, is affixed to the rear portion at a joint, and includes the primary and secondary cutting edges.

19. The spade drill bit of claim 11, wherein the first steel alloy comprises carbon steel alloy or low alloy carbon steel and wherein the second steel alloy comprises a high chromium steel alloy or a high speed steel or tool steel alloy.

20. A spade drill bit comprising: a shank extending along an axis from a rear end to a front end, the rear end configured to be coupled to a tool holder of a power tool; a blade including a paddle extending along the axis with a rear portion coupled to the front end of the shank and a front portion coupled to a front end of the rear portion at a joint; an at least partially threaded frustoconical tip coupled to the front portion of the paddle; first and second primary cutting edges disposed on a front edge of the front portion of the paddle and extending radially outward from the tip; and first and second secondary cutting edges disposed on first and second chamfered corner edges of the front portion of the paddle, the first and second chamfered corner edges and tapering radially outward and axially rearward from the first and second primary cutting edges toward the rear portion; wherein the paddle includes a first face with a first concave surface disposed on a first side of the axis and extending rearward from the first primary cutting edge along at least a portion of the paddle, and a second face opposite the first face with a second concave surface disposed on a second side of the axis opposite the first side and extending rearward from the second primary cutting edge axis along at least a portion of the paddle, wherein the first concave surface has a first portion closer to the first primary cutting edge with a first radius of curvature and a second portion closer to the rear portion with a second radius of curvature that is greater than the first radius of curvature, and wherein the rear portion of the paddle is composed of a first carbon steel or low alloy carbon steel, and the front portion of the paddle, which includes the primary and secondary cutting edges, is composed of a second high chromium steel alloy or a high speed steel or tool steel alloy that has a greater hardness than the first steel alloy.

* * * * *